United States Patent
Wu et al.

(10) Patent No.: US 10,303,691 B2
(45) Date of Patent: May 28, 2019

(54) COLUMN-ORIENTED DATABASE PROCESSING METHOD AND PROCESSING DEVICE

(71) Applicant: HUAWEI TECHNOLOGIES CO., LTD., Shenzhen, Guangdong (CN)

(72) Inventors: Jimin Wu, Shenzhen (CN); Qing Zhang, Shenzhen (CN); Chenghua Liu, Shenzhen (CN); Yong Deng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 411 days.

(21) Appl. No.: 15/173,971

(22) Filed: Jun. 6, 2016

(65) Prior Publication Data

US 2016/0283558 A1   Sep. 29, 2016

Related U.S. Application Data

(63) Continuation of application No. PCT/CN2014/090337, filed on Nov. 5, 2014.

(30) Foreign Application Priority Data

Dec. 6, 2013   (CN) .......................... 2013 1 0656482

(51) Int. Cl.
*G06F 16/21*   (2019.01)
*G06F 16/22*   (2019.01)
(Continued)

(52) U.S. Cl.
CPC ...... *G06F 16/24575* (2019.01); *G06F 16/219* (2019.01); *G06F 16/221* (2019.01);
(Continued)

(58) Field of Classification Search
CPC ......... G06F 17/30315; G06F 17/30312; G06F 17/30595; G06F 17/30424;
(Continued)

(56) References Cited

U.S. PATENT DOCUMENTS 5,794,229 A   8/1998   French et al.
6,009,432 A   12/1999   Tarin et al.
(Continued)

FOREIGN PATENT DOCUMENTS

CN   101727465 A   6/2010
CN   102682108 A   9/2012
(Continued)

OTHER PUBLICATIONS

Takuya Yoshida, "Influencing Dedicated High-speed DB Software for Searching", in decision support system, Nikkei Ccomputer, Japan, Nikkei BP company, Jul. 22, 1996, No. 396, pp. 105 to 108.
(Continued)

*Primary Examiner* — Angelica Ruiz
(74) *Attorney, Agent, or Firm* — James Anderson Harrison

(57) ABSTRACT

Embodiments of the present invention provide a column-oriented database processing method, where a column-oriented database includes a marker column and more than one data column, the data column is used to store specific data in a column store manner, a value of a marker bit of each row in the marker column is used to indicate validity of data that is located in a same row as the marker bit, and the method includes: receiving a query request sent by an application program, where the query request contains a query condition; querying the more than one data column according to the marker column and the query condition to obtain a query result that meets both the query condition and a requirement that a marker bit of the query result in the
(Continued)

marker column is valid; and sending the query result to the application program.

19 Claims, 10 Drawing Sheets

(51) Int. Cl.
*G06F 16/23* (2019.01)
*G06F 16/248* (2019.01)
*G06F 16/2455* (2019.01)
*G06F 16/2457* (2019.01)

(52) U.S. Cl.
CPC ...... *G06F 16/2237* (2019.01); *G06F 16/2329* (2019.01); *G06F 16/2343* (2019.01); *G06F 16/248* (2019.01); *G06F 16/24557* (2019.01)

(58) Field of Classification Search
CPC ......... G06F 17/30463; G06F 17/30286; G06F 17/30339; G06F 17/30569
See application file for complete search history.

(56) References Cited

U.S. PATENT DOCUMENTS

| | | | |
|---|---|---|---|
| 2005/0216518 A1 | 9/2005 | Hu et al. | |
| 2006/0122876 A1* | 6/2006 | Von Schweber | G06F 17/30705 705/7.32 |
| 2007/0112736 A1 | 5/2007 | Okamoto et al. | |
| 2009/0240663 A1* | 9/2009 | Plattner | G06F 17/30592 |
| 2010/0131490 A1* | 5/2010 | Lamb | G06F 17/30424 707/714 |
| 2010/0235335 A1* | 9/2010 | Heman | G06F 17/30345 707/703 |
| 2011/0270871 A1* | 11/2011 | He | G06F 17/30324 707/769 |
| 2011/0314027 A1 | 12/2011 | Xu et al. | |
| 2012/0209873 A1* | 8/2012 | He | G06F 16/24556 707/769 |
| 2013/0179395 A1* | 7/2013 | Heman | G06F 17/30345 707/609 |
| 2013/0198168 A1* | 8/2013 | Huang | G06F 17/30424 707/722 |
| 2013/0275365 A1* | 10/2013 | Wang | G06F 17/30592 707/602 |

FOREIGN PATENT DOCUMENTS

| | | |
|---|---|---|
| CN | 102890721 A | 1/2013 |
| CN | 103324765 A | 9/2013 |
| CN | 103678556 A | 3/2014 |
| JP | H02501604 A | 5/1990 |
| JP | H09305622 A | 11/1997 |
| JP | 2000020385 A | 1/2000 |
| JP | 2007531115 A | 11/2007 |
| WO | 88001411 A1 | 2/1988 |

OTHER PUBLICATIONS

Eldelstein Herb, Technical Forum from U. S. A., Nikkei Computer, Japan, Nikkei BP Inc., Feb. 5, 1996, No. 384, pp. 139-144.

Ukiki Masayuki, Sybase IQ "Approach to data warehouses with proprietary data structures", Technical report of Institute of Electronics, Information and Communication Engineers vol. 97, No. 415, Japan, The Institute of Electronics, Information and Communication Engineers, Dec. 2, 1997, 97 vol. No. 415, pp. 51 to 56.

Koichi Tanigawa, Function Enhancement Point of Orfacle 7.3, Network Computing, Japan, Rikku Telecom Co., Ltd., Jul. 1, 1996, vol. 8, No. 7, pp. 73-80.

Takahashi Hidekazu, "Part 4 One day leader in RDB with large scalability", Nikkei Byte, Nikkei BP company Nikkei Business Publications, Inc., Mar. 22, 2004, No. 251, p. 38-43.

Yule Hu,"Research of Key Technology of Index in Column-Oriented DWMS", Donghua University,dated Jul. 15, 2011,total 83 pages.

ElmasriR; Navathe S B(Eds) Chapter 2: database system concepts and architecture Ed, Fundamentals of Database Systems(Sixth Edition), Addison-Wesley, pp. 29-55. Jan. 1, 2011,XP009171284. total 30 pages.

ElmasriR; Navathe S B(Eds) Chapter 4:basic SQL Ed, Fundamentals of Database Systems(Sixth Edition), Addison-Wesley, pp. 87-114. Jan. 1, 2011,XP9171302. total 28 pages.

ElmasriR; Navathe S B(Eds) Chapter 18:indexing structures for files Ed, Fundamentals of Database Systems(Sixth Edition), Addison-Wesley, pp. 631-675.Jan. 1, 2011,XP9171422, total 45 pages.

Stonebraker et al:"C-store:A column-oriented DBMS", proc. 31ct vldb, trondheim, norway. Jan. 1, 2005,XP8103215. total 12 pages.

* cited by examiner

COLUMN-ORIENTED DATABASE PROCESSING METHOD AND PROCESSING DEVICE

CROSS-REFERENCE TO RELATED APPLICATION

This application is a continuation of International Application PCT/CN2014/090337, filed on Nov. 5, 2014, which claims priority to Chinese Patent Application No. 201310656482.1, filed on Dec. 6, 2013, both of which are hereby incorporated by reference in their entireties.

TECHNICAL FIELD

Embodiments of the present invention relate to database technologies, and in particular, to a column-oriented database processing method and a processing device.

BACKGROUND

A column-oriented database is a database that stores data by using a column-related storage architecture. Data in each column is serialized and stored independently, and data in a row spreads across different columns and is separately stored in different data areas.

The column-oriented database has two storage areas: a row area and a column area. Original data is stored in the column area; and new data generated by a data manipulation language (DML) transaction operation is stored in the row area. Although data is organized by column, rows of data may be actually required to be in consistent format. Therefore, when a data modification is made, modifications to different columns are involved, and in this process, Atomicity, Consistency, Isolation, Durability (ACID) attributes that guarantee that database transactions are processed concurrently and need to be guaranteed in the row area.

Query efficiency in the column-oriented database is often reduced using such databases, especially when a capacity of a database is large.

SUMMARY

Embodiments of the present invention provide a column-oriented database processing method and a processing device, so as to improve query efficiency.

According to a first aspect, one embodiment of the present invention provides a processing device, including:

a processor; and a non-transitory computer-readable storage medium coupled to the processor for storing programming instructions for execution by the processor, the programming instructions, when executed, prompt the processor to:

receive a query request sent by an application program, wherein the query request contains a query condition for a column-oriented database, wherein the column-oriented database comprises a marker column and more than one data column, the data column is used to store specific data in a column store manner, and a value of a marker bit of each row in the marker column is used to indicate validity of data that is located in a same row as the marker bit;

query the more than one data column according to the marker column and the query condition to obtain a query result that meets both the query condition and a requirement that a marker bit of the query result in the marker column is valid; and receive the query result sent by the query module and send the query result to the application program.

According to a second aspect, the present invention further provides another processing device, including a processor; and a non-transitory computer-readable storage medium coupled to the processor and storing programming instructions for execution by the processor, the programming instructions instruct the processor to: receive, in a transaction, a modification request sent by an application program, wherein the modification request contains a modification condition, a column-oriented database includes a marker column and more than one data column, the data column is used to store specific data in a column store manner, and a value of a marker bit of each row in the marker column is used to indicate validity of data that is located in a same row as the marker bit; and apply modification processing to the marker column and the more than one data column according to the modification condition, and record a modification that is to be made to the marker column when the transaction is submitted; and when the transaction is submitted, make a corresponding modification to the marker column according to the recorded modification that is to be made to the marker column when the transaction is submitted, so that a value of a marker bit of each row in a modified marker column indicates validity of data that is located in a same row as the marker bit after the modification processing.

According to a third aspect, the present invention provides a column-oriented database processing method, where a column-oriented database includes a marker column and more than one data column, the data column is used to store specific data in a column store manner, a value of a marker bit of each row in the marker column is used to indicate validity of data that is located in a same row as the marker bit, and the method includes: receiving a query request sent by an application program, where the query request contains a query condition; querying the more than one data column according to the marker column and the query condition to obtain a query result that meets both the query condition and a requirement that a marker bit of the query result in the marker column is valid; and sending the query result to the application program.

In a first possible implementation of the third aspect, the querying the more than one data column according to the marker column and the query condition to obtain a query result that meets both the query condition and a requirement that a marker bit of the query result in the marker column is valid specifically includes: scanning, according to the query condition, a data column involved in the query condition, and generating conditional bitmap, where a row in the involved data column meets the query condition, a corresponding row in the conditional bitmap is assigned a valid value, and a row in the involved data column does not meet the query condition, a corresponding row in the conditional bitmap is assigned an invalid value; generating a query bitmap according to the marker column and the conditional bitmap, where when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and obtaining, according to the query bitmap, the query result that meets both the query condition and a requirement that the marker bit of the query result in the marker column is valid.

With reference to the first possible implementation of the third aspect, in a second possible implementation, before the scanning, according to the query condition, a data column involved in the query condition, the method further includes: determining a modification that is to be made to the marker column when a transaction is submitted exists, where the transaction is a transaction in which the query request is located, storing the marker column in a temporary storage area, using the stored marker column as a private marker column of the query request, and updating the private marker column according to the modification that is to be made to the marker column when the transaction is submitted, so that a value of a modified marker bit in the updated private marker column indicates validity of data corresponding to the current marker bit in the transaction; and the generating a query bitmap according to the marker column and the conditional bitmap, where when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and obtaining, according to the query bitmap, the query result that meets both the query condition and a requirement that the marker bit of query result in the marker column is valid is specifically: generating a query bitmap according to the updated private marker column and the conditional bitmap, where when a value of a same row in both the updated private marker column and the conditional bitmap is a valid value, a value of a same row in the query bitmap is valid, or when a value of a same row in the updated private marker column and that in the conditional bitmap are not both valid values, a value of a same row in the query bitmap is invalid; and obtaining, according to the query bitmap, a query result that meets both the query condition and a requirement that a marker bit of the query result in the updated private marker column is valid.

With reference to the first possible implementation of the third aspect, in a third possible implementation, before the scanning step, the method further includes: determining a modification that is to be made to the marker column when submission of a transaction does not exist, where the transaction is a transaction in which the query request is located; when no shared marker column is stored in a temporary storage area or when a version number of a shared marker column that has been stored in the temporary storage area is different from a marker column version number in a table header, storing, in the temporary storage area, a marker column version number and the marker column which are in a data storage area, using the stored marker column as another shared marker column, setting a correspondence between a version number of the another shared marker column and the query request, or when the version number of the stored shared marker column is the same as the marker column version number in the table header, setting a correspondence between the version number of the stored shared marker column and the query request; and the generating step further comprises: determining, in the temporary storage area and according to the correspondence between the version number of the another or stored shared marker column and the query request, a shared marker column corresponding to the query request, and generating a query bitmap according to the conditional bitmap and the shared marker column that is corresponding to the query request, where when a value of a same row in both the shared marker column corresponding to the query request and the conditional bitmap is a valid value, a value of a same row in the query bitmap is valid, or when a value of a same row in the shared marker column corresponding to the query request and that in the conditional bitmap are not both valid values, a value of a same row in the query bitmap is invalid; and obtaining, according to the query bitmap, a query result that meets both the query condition and a requirement that a marker bit of the query result in the shared marker column corresponding to the query request is valid.

According to a fourth aspect, the present invention provides a column-oriented database processing method, where a column-oriented database includes a marker column and more than one data column, the data column is used to store specific data in a column store manner, a value of a marker bit of each row in the marker column is used to indicate validity of data that is located in a same row as the marker bit, and the method includes: receiving, in a transaction, a modification request sent by an application program, where the modification request contains a modification condition; applying modification processing to the marker column and the more than one data column according to the modification condition, and recording a modification that is to be made to the marker column when the transaction is submitted; and when the transaction is submitted, making a corresponding modification to the marker column according to the recorded modification that is to be made to the marker column when the transaction is submitted, so that a value of a marker bit of each row in the modified marker column indicates validity of data that is located in a same row as the marker bit after the modification processing.

According to a fifth aspect, the present invention further provides a processing device, including a transceiver and a processor, where: the transceiver is configured to receive a query request sent by an application program, where the query request contains a query condition, send the query request to the processor, and receive a query result sent by the processor; where a column-oriented database includes a marker column and more than one data column, the data column is used to store specific data in a column store manner, and a value of a marker bit of each row in the marker column is used to indicate validity of data that is located in a same row as the marker bit; and the processor is configured to receive the query request sent by the transceiver, query the more than one data column according to the marker column and the query condition to obtain a query result that meets both the query condition and a requirement that a marker bit of the query result in the marker column is valid, and send the query result to the transceiver.

In a first possible implementation of the fifth aspect, that the processor is specifically configured to query the more than one data column according to the marker column and the query condition to obtain a query result that meets both the query condition and a requirement that a marker bit of the query result in the marker column is valid specifically includes: scanning, according to the query condition, a data column involved in the query condition, and generating conditional bitmap, where a row in the involved data column meets the query condition, a corresponding row in the conditional bitmap is assigned a valid value, and a row in the involved data column does not meet the query condition, a corresponding row in the conditional bitmap is assigned an invalid value; generating a query bitmap according to the marker column and the conditional bitmap, where when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and obtaining, according to the query bitmap, the query result that meets both the query condition and a requirement that the marker bit of the query result in the marker column is valid.

With reference to the first possible implementation of the fifth aspect, in a second possible implementation, the processor is further configured to: before scanning, according to the query condition, a data column involved in the query condition, determine a modification that is to be made to the marker column when a transaction is submitted exists, where the transaction is a transaction in which the query request is located, store the marker column in a temporary storage area, use the stored marker column as a private marker column of the query request, and update the private marker column according to the modification that is to be made to the marker column when the transaction is submitted, so that a value of a modified marker bit in the updated private marker column indicates validity of data corresponding to the current marker bit in the transaction; and the processor is further configured to: generate a query bitmap according to the updated private marker column and the conditional bitmap, where when a value of a same row in both the updated private marker column and the conditional bitmap is a valid value, a value of a same row in the query bitmap is valid, or when a value of a same row in the updated private marker column and that in the conditional bitmap are not both valid values, a value of a same row in the query bitmap is invalid; and obtain, according to the query bitmap, a query result that meets both the query condition and a requirement that a marker bit of the query result in the updated private marker column is valid.

With reference to the first possible implementation of the fifth aspect, in a third possible implementation, the processor is further configured to: before scanning, according to the query condition, a data column involved in the query condition, determine a modification that is to be made to the marker column when submission of a transaction does not exist, where the transaction is a transaction in which the query request is located; when no shared marker column is stored in a temporary storage area or when a version number of a shared marker column that has been stored in the temporary storage area is different from a marker column version number in a table header, store, in the temporary storage area, a marker column version number and the marker column which are in a data storage area, use the stored marker column as another shared marker column, and establish a correspondence between a version number of the another shared marker column and the query request, or when the version number of the stored shared marker column is the same as the marker column version number in the table header, establish a correspondence between the version number of the stored shared marker column and the query request; and the processor is further configured to: determine, in the temporary storage area and according to the correspondence between the version number of the another or stored shared marker column and the query request, a shared marker column corresponding to the query request, and generate a query bitmap according to the conditional bitmap and the shared marker column that is corresponding to the query request, where when a value of a same row in both the shared marker column corresponding to the query request and the conditional bitmap is a valid value, a value of a same row in the query bitmap is valid, or when a value of a same row in the shared marker column corresponding to the query request and that in the conditional bitmap are not both valid values, a value of a same row in the query bitmap is invalid; and obtain, according to the query bitmap, a query result that meets both the query condition and a requirement that a marker bit of the query result in the shared marker column corresponding to the query request is valid.

According to a sixth aspect, the present invention provides a processing device, including a transceiver and a processor, where the transceiver is configured to: receive, in a transaction, a modification request sent by an application program, where the modification request contains a modification condition, send the modification request to the processor, and receive a modification result sent by the processor; where a column-oriented database includes a marker column and more than one data column, the data column is used to store specific data in a column store manner, and a value of a marker bit of each row in the marker column is used to indicate validity of data that is located in a same row as the marker bit; and the processor is configured to: receive the modification request sent by the transceiver, apply modification processing to the marker column and the more than one data column according to the modification condition, and record a modification that is to be made to the marker column when the transaction is submitted; and when the transaction is submitted, make a corresponding modification to the marker column according to the recorded modification that is to be made to the marker column when the transaction is submitted, so that a value of a marker bit of each row in a modified marker column indicates validity of data that is located in a same row as the marker bit after the modification processing.

In the embodiments of the present invention, a marker column that is specially used to indicate validity of a numerical value of each row in a data column is added in a column-oriented database; in this way, it can be implemented, by using the marker column, that all data is stored in a column area, and a special row area is not required to store data at the time of data modification. Consequently, when a data query is performed, the data query can be completely performed in the column area which eliminates the need for a query in the row area and improves the data query efficiency. The improvement is noticeably significant in scenarios of big data.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention.

DESCRIPTION OF EMBODIMENTS

Figure 1:
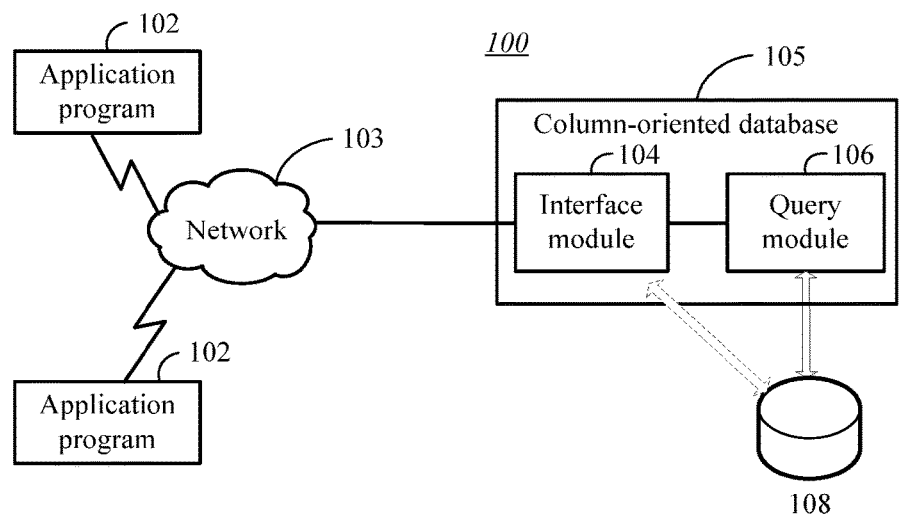
FIG. 1 is a schematic diagram of a network environment according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

First, descriptions of the embodiments begin with an introduction of a column-oriented store architecture proposed in the embodiments of the present invention. In a column-oriented database, data and a table header are stored separately. The table header includes an attribute of each column and a current entry count. The attribute may include a name of a column, a field type of a numerical value in the column, a start address of the column, and the like; for example, Table 1 is a table header, and the table header may be a column name, a field attribute, or a start address of a column, where the column name may be, for example, a row number, a mark, F2, or F3; the field attribute of numerical value in each column is an integral type, a character type, a long integer type, or the like; the start address of a column is used to locate an entry from which data scanning starts during a query, update, delete, or else operation; data scanning and reading continues until the number of scanned entries reaches the current entry count. In addition, a version number of a current marker column is recorded in the marker column. Each time the marker column is updated, the marker column version number is updated. Generally, the marker column version number may be a progressively increasing number or may be a letter plus a progressively increasing number; for example, a current version number of the current marker column is v1, and after the marker column is updated, the marker column version number is updated to v2. The current entry count indicates how many rows of values are present in the current table; for example, as shown in Table 1, there are 4 rows of data; in this case, the current entry count is 4.

TABLE 1

| Attribute of row number column | Attribute of marker column | Attribute of data column F2 | Attribute of data column F3 | Current entry count: 4 |
|---|---|---|---|---|

Generally, a column-oriented database receives an update operation request, in which an SQL statement is as follows: UPDATE TABLE1 SET F2=10 WHERE F3<20, and the column-oriented database executes the following operations:

1. Scan TABLE1, and record a row number of an entry that satisfies the update condition F3<20.

2. Add an exclusive lock to the row number, so that the entry corresponding to the row number cannot be modified by another session.

3. Read all fields of the entry corresponding to the row number, change a value of F2 to 10, and then put all the fields together to form a row entry.

4. Store the row entry in the row area, and after the current data updating is complete, release the exclusive lock of the row number.

In the column-oriented database, some data is stored in the row area. Therefore, upon receiving a query request, the column-oriented database has to search for all entries in the session to determine whether the queried entry or entries have been submitted; for example, steps of processing the query request SELECT F2 FROM TABLE1 WHERE F3<20 are as follows:

1. Scan the TABLE1 column area, and record a row number of an entry that satisfies the query condition F3<20.

2. Determine whether the foregoing recorded row number has been modified; if the recorded row number is not modified, go to step 3 to read a value of F2 in the column area; if the recorded row number has been modified, it is necessary to go to step 4 to read a new entry after the modification in the row area, in addition to performing step 3.

3. Determine, in the row area, whether the latest version of the entry is a version modified in the session; if yes, return the latest version; if not, return a previously submitted version.

4. After scanning the column area is complete, scan the row area for newly added data, and determine whether any newly added data satisfies the query condition F3<20; if there is newly added data satisfying the query condition F3<20, output the value of F2. As can be seen from the foregoing discussion, in the prior art, both a row area and a column area have to be involved in transaction processing for a column-oriented database. When data is queried in the column-oriented database, it may be required to scan data in the row area row by row because the row area, together with the column area, are integral to the column-oriented database. As a result, the query efficiency in the column-oriented database is reduced; and the reduction is noticeably significant especially when a capacity of a database is large. Accordingly, the described embodiments help overcome such inefficiencies.

As shown in Table 2, it is a schematic view of a column store table provided in the embodiments of the present invention. The column-oriented database may include three types of columns, namely, a row number column, a marker column, and a data column. A value of each row in the row number column uniquely identifies a row of data. When a row of data is to be modified in a transaction, a lock is added to a row number of the row. There may be a lock adding area in the column-oriented database, and a row to which a lock is added is recorded in the lock adding area. When a transaction needs to modify a row of data in the column-oriented database, the transaction needs to inquire, in the lock adding area, whether a lock has been added to the row; if a lock has been added to the row of data, the transaction cannot modify the row of data, thereby preventing the row from being simultaneously modified by different transactions. This approach proves useful in preventing a data collision. When the modify transaction is submitted successfully, the lock may be released in the lock adding area. A value of each row in the marker column indicates whether each row of data is valid; for example, a value of each row in the marker column may be 0 or 1, where 0 may indicate that data in the row is invalid currently, for example, because the data in the row is being modified or being deleted, and 1 may indicate that data in the row is valid currently, namely, the data in the row is not being modified currently. The second column in Table 1 indicates an attribute of a second column in Table 2, where the attribute is a mark, which means that the marker column is the second column in Table 2. Generally, the marker column is a bitmap. The data column stores specific data, and each column of data is stored separately. Apparently, Table 2 presents only two data columns: F2 and F3. In an actual database, multiple data columns may exist. The third column in Table 1 indicates an attribute of a third column in Table 2, where the attribute is F2; and the fourth column in Table 1 indicates an attribute of a fourth column in Table 2, where an attribute field is F3. In addition, the first column in Table 1 indicates an attribute of a first column in Table 2, where the attribute is a row number.

TABLE 2

| 1 | 1 | a | 10 |
| 2 | 1 | b | 30 |
| 3 | 1 | c | 30 |
| 4 | 1 | d | 10 |

A storage area in column-oriented store may include the following parts: a data storage area, a transaction storage area, and a temporary storage area. The data storage area is used to store specific data, for example, content of the foregoing Table 1 and Table 2. The temporary storage area is used to store data temporarily when transaction processing is in progress. This storage area may be inside the data storage area, or may be a separate storage area; for example, in the embodiments of the present invention, intermediate data generated during a process of adding, deleting, modifying, and querying data may be stored in the temporary storage area, for example, a copy of marker column, and a conditional bitmap and query bitmap which are generated during a query. After a transaction is submitted successfully, temporary data related to the transaction is deleted from the data that is temporarily stored. A transaction log is stored in the transaction storage area, where the transaction log records operations performed by a current transaction and a modification that is to be made to a marker column when the transaction is submitted. Then, when the transaction is submitted, the marker column may be modified according to the transaction log. After one transaction is submitted successfully, a log of the transaction is deleted.

A database transaction, hereinafter referred to as transaction, refers to a series of operations executed by a single logical work unit, where the series of operations are either completely executed or not executed at all. Transaction processing can ensure that data-oriented resources are updated permanently only when all operations in a transactional unit are implemented successfully. A group of related operations is combined into a unit in which all operations are implemented either successfully or unsuccessfully, so that error recovery can be simplified and an application program becomes more reliable. If a logical work unit needs to become a transaction, a so-called ACID (atomicity, consistency, isolation, and durability) attribute may be satisfied. One transaction may include multiple operations; however, the operations are arranged chronologically; and a result of each operation included in the transaction takes effect only after the transaction is submitted successfully.

FIG. 1 is a schematic diagram of a network environment according to an embodiment of the present invention. An application program 102 refers to a computer program that may provide various specified functions, including but not limited to a charging application, an Internet browser, a multimedia player, and the like. The application program may access a column-oriented database 105 through a communications network 103. The column-oriented database 105 includes an interface module 104 and a query module 106. The interface module 104 is configured to receive a query request sent by the application program, and connect to and access the query module 106. The query module 106 is configured to manage data and execute the query request forwarded by the interface module 104. Further, the column-oriented database 105 connects to a storage engine 108. The storage engine 108 stores data in the column-oriented database and is a structural data set. The interface module 104 or the query module 106 may drive the storage engine 108 and receive data returned by the storage engine. For example, the storage engine 108 may be included into the query module 106, or may reside in a memory outside the query module 106.

Figure 2:
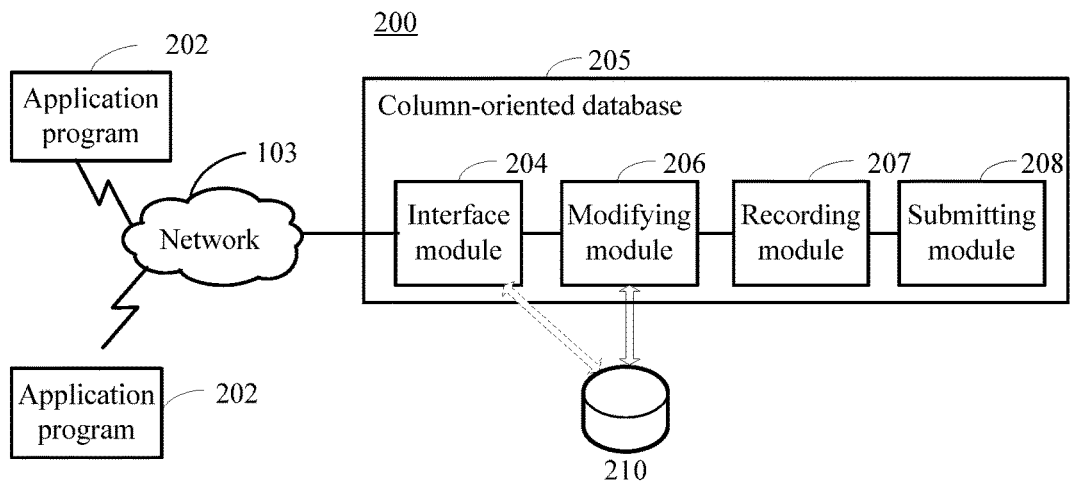
FIG. 2 is a schematic diagram of another network environment according to an embodiment of the present invention.

FIG. 2 is a schematic diagram of another network environment according to the present invention. An application program 202 refers to a computer program that may provide various specified functions, including but not limited to a charging application, an Internet browser, a multimedia player, and the like. The application program may access a column-oriented database 205 through a communications network 203. The column-oriented database 205 includes an interface module 204, a modifying module 206, a recording module 207, and a submitting module 208. The interface module 204 is configured to receive a modification request sent by the application program, and connect to and access the modifying module 206. The modifying module 206 is configured to manage data and execute the modification request forwarded by the interface module 204; in a modification process, the recording module 207 records a modification that is to be made to a marker column when a transaction is submitted; and the submitting module 208 is configured to: when the transaction is submitted, make a corresponding modification to the marker column according to the recorded modification that is to be made to the marker column at the time of submitting the transaction, so that a value of a marker bit of each row in the modified marker column indicates validity of data that is located in a same row as the marker bit after the modification processing. Further, the column-oriented database 205 connects to a storage engine 210. The storage engine 210 stores data in the column-oriented database and is a structural data set. The interface module 204 or the modifying module 206 may drive the storage engine 210 and receive data returned by the storage engine.

Figure 3:
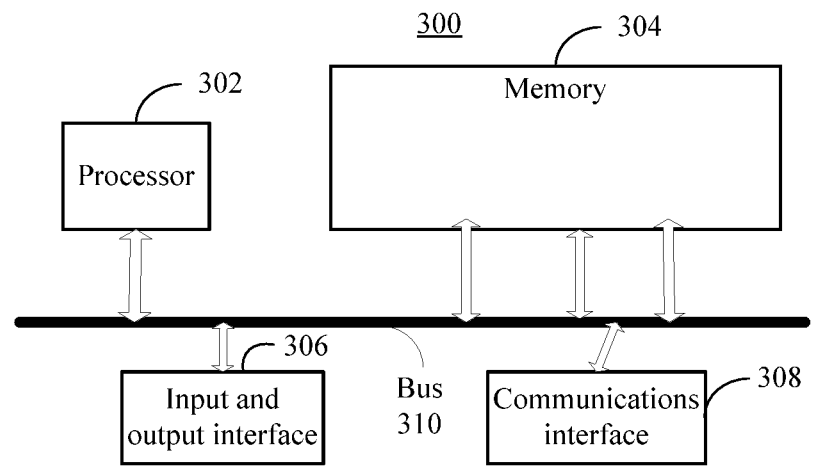
FIG. 3 is a schematic block diagram of a processing device according to an embodiment of the present invention.

FIG. 3 is a schematic block diagram of a processing device according to an embodiment of the present invention.

In this embodiment, the processing device may be a computer host and specifically includes a processor-based computer, such as a universal personal computer (PC), and a portable device such as a tablet computer or a smart phone. As shown in FIG. 3, the processing device 300 may include a bus 310, a processor 302, a memory 304, an input and output interface 306, and a communications interface 308. The bus 310 may include a channel and transmit information between components of a computer. The processor 302 is configured to process information and execute an instruction or an operation, and may specifically be a universal central processing unit (CPU), a micro processor, an application-specific integrated circuit (ASIC), or one or more integrated circuits configured to control execution of a program in the solution of the present invention. The processing device further includes one or more memories 304, which are configured to store information and an instruction. The memory may be a read-only memory (ROM) or a static storage device of another type that can store static information and a static instruction, and may also be a random access memory (RAM) or a dynamic storage device of another type that can store information and an instruction, and may also be a disk memory. These memories connect to the processor 302 by using the bus 310.

The input and output interface 306 may include an input apparatus or an output apparatus. The input apparatus is configured to receive data and information input by a user, for example, the input apparatus may be a keyboard, a mouse, a camera, a scanner, a light pen, a voice input apparatus, or a touch screen. The output apparatus is configured to allow information to be output or displayed to a user and includes a display screen, a printer, a speaker, and the like. The processing device further includes a network interface 308, where the network interface uses any apparatus such as a transceiver to communicate with another device or a communications network, for example, the Ethernet, a radio access network (RAN), and a wireless local area network (WLAN). The processor 302 may also connect to the input and output interface 306 and the network interface 308 by using the bus 310.

The memory 304 stores a program for executing the solution of the present invention, where the solution includes: receiving a query request sent by an application program, where the query request contains a query condition for a column-oriented database, the column-oriented database includes a marker column and more than one data column, the data column is used to store specific data in a column store manner, and a value of a marker bit of each row in the marker column is used to indicate validity of data that is located in a same row as the marker bit; querying the more than one data column according to the marker column and the query condition to obtain a query result that meets both the query condition and a requirement that a marker bit of the query result in the marker column is valid; and sending the query result to the application program. The memory 304 may further store an operating system and another application program.

In another embodiment of the present invention, the memory 304 further includes a program for executing the solution of the present invention, where the solution includes: receiving, in a transaction, a modification request sent by the application program, where the modification request contains a modification condition for a column-oriented database, the column-oriented database includes a marker column and more than one data column, the data column is used to store specific data in a column store manner, and a value of a marker bit of each row in the marker column is used to indicate validity of data that is located in a same row as the marker bit; applying modification processing to the marker column and the more than one data column according to the modification condition, and recording a modification that is to be made to the marker column when the transaction is submitted; when the transaction is submitted, making a corresponding modification to the marker column according to the recorded modification that is to be made to the marker column at the time of submitting the transaction, so that a value of a marker bit of each row in the modified marker column indicates validity of data that is located in a same row as the marker bit after the modification processing; and sending a modification response to the application program. The memory 304 may further store an operating system and another application program.

Figure 4:
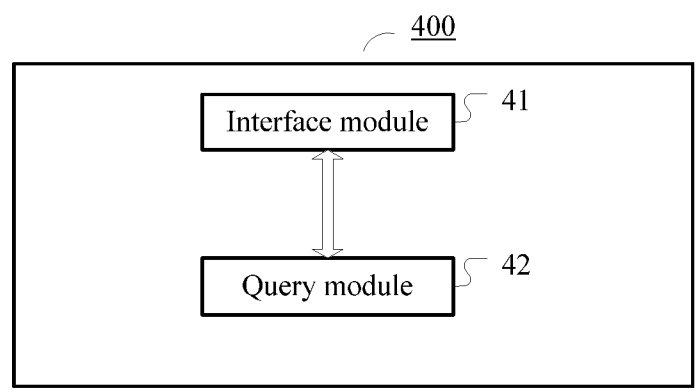
FIG. 4 is a schematic block diagram of another processing device according to an embodiment of the present invention.

As shown in FIG. 4, a processing device provided in an embodiment of the present invention includes:

an interface module 41, configured to: receive a query request sent by an application program, where the query request contains a query condition for a column-oriented database; and send the query request to a query module, where the column-oriented database includes a marker column and more than one data column, the data column is used to store specific data in a column store manner, and a value of a marker bit of each row in the marker column is used to indicate validity of data that is located in a same row as the marker bit; and the query module 42, configured to: query the more than one data column according to the marker column and the query condition to obtain a query result that meets both the query condition and a requirement that a marker bit of the query result in the marker column is valid, and send the query result to the interface module, where:

the interface module 41 is further configured to receive the query result sent by the query module and send the query result to the application program.

Figure 5:
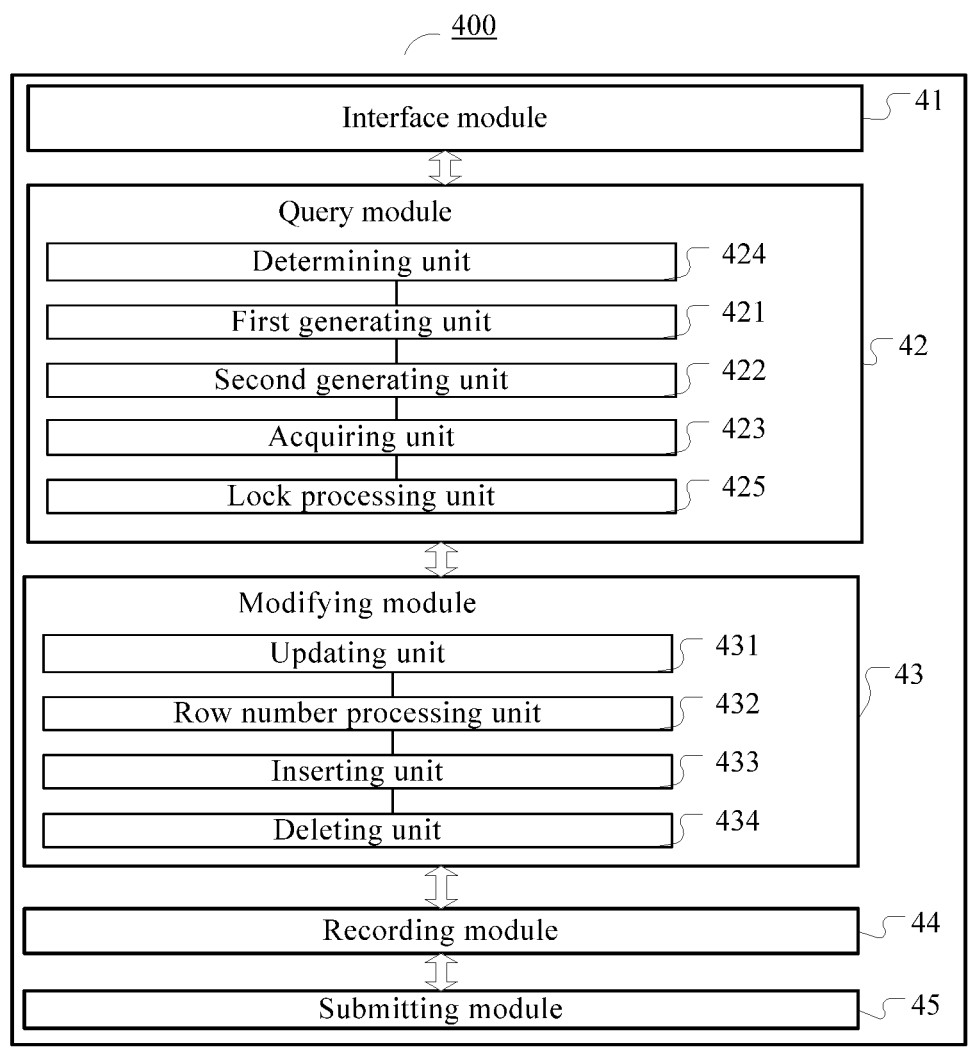
FIG. 5 is a schematic block diagram of another processing device according to an embodiment of the present invention.

Further, as shown in FIG. 5, the query module 42 includes a first generating unit 421, a second generating unit 422, and an acquiring unit 423.

The first generating unit 421 is configured to scan, according to the query condition, a data column involved in the query condition and generate conditional bitmap, where a row in the involved data column meets the query condition, a corresponding row in the conditional bitmap is assigned a valid value, and a row in the involved data column does not meet the query condition, a corresponding row in the conditional bitmap is assigned an invalid value.

The second generating unit 422 is configured to generate a query bitmap according to the marker column and the conditional bitmap, where when a value of a same row in both a marker column and the conditional bitmap is a valid value, a value of a same row in the query bitmap is valid, or when a value of a same row in the marker column and that in the conditional bitmap are not both valid values, a value of a same row in the query bitmap is invalid.

The acquiring unit 423 is configured to obtain, according to the query bitmap, a query result that meets both the query condition and a requirement that the marker bit of the query result in the marker column is valid.

Further, the second generating unit 422 is specifically configured to: when the marker column is a bitmap, perform an AND operation on the marker column and the conditional bitmap to generate the query bitmap, where a value of a marker bit in the marker column, a value of each row in the conditional bitmap, and a value of each row in the query bitmap are 0 or 1.

Further, as shown in FIG. 5, the query module 42 further includes a determining unit 424, where:

the determining unit 424 is configured to: determine a modification that is to be made to the marker column when a transaction is submitted exists, where the transaction is a transaction in which the query request is located, store the marker column in a temporary storage area, use the stored marker column as a private marker column of the query request, and update the private marker column according to the modification that is to be made to the marker column when the transaction is submitted, so that a value of a modified marker bit in the updated private marker column indicates validity of data corresponding to the current marker bit in the transaction;

the second generating unit 422 is specifically configured to generate a query bitmap according to the updated private marker column and the conditional bitmap, where when a value of a same row in both the updated private marker column and the conditional bitmap is a valid value, a value of a same row in the query bitmap is valid, or when a value of a same row in the updated private marker column and that in the conditional bitmap are not both valid values, a value of a same row in the query bitmap is invalid; and the acquiring unit 423 is specifically configured to obtain, according to the query bitmap, a query result that meets both the query condition and a requirement that a marker bit of the query result in the updated private marker column is valid.

In addition, the determining unit 424 is further configured to: determine a modification that is to be made to the marker column when a transaction is submitted does not exist, where the transaction is a transaction in which the query request is located; when no shared marker column is stored in a temporary storage area or when a version number of a shared marker column that has been stored in the temporary storage area is different from a marker column version number in a table header, store in the temporary storage area a marker column version number and the marker column which are in a data storage area, use the stored marker column as another shared marker column, establish a correspondence between a version number of the another shared marker column and the query request, or when the version number of the stored shared marker column is the same as the marker column version number in the table header, establish a correspondence between the version number of the stored shared marker column and the query request;

the second generating unit 422 is specifically configured to generate a query bitmap according to the updated private marker column and the conditional bitmap, where when a value of a same row in both the updated private marker column and the conditional bitmap is a valid value, a value of a same row in the query bitmap is valid, or when a value of a same row in the updated private marker column and that in the conditional bitmap are not both valid values, a value of a same row in the query bitmap is invalid; and the acquiring unit 423 is specifically configured to obtain, according to the query bitmap, a query result that meets both the query condition and a requirement that a marker bit of the query result in the updated private marker column is valid.

Further, as shown in FIG. 5, the query module 42 further includes: a lock processing unit 425, configured to add an exclusive lock to the marker column before the copying the marker column and release the exclusive lock for the marker column after the copying the marker column.

Further, as shown in FIG. 5, the processing device further includes: a modifying module 43, a recording module 44, and a submitting module 45, where:

the interface module 41 is further configured to: receive, in a transaction, a modification request sent by an application program, where the modification request contains a modification condition, and send the modification request to the modifying module;

the modifying module 43 is configured to receive the modification request sent by the interface module and apply modification processing to the marker column and the more than one data column according to the modification condition;

the recording module 44 is configured to record a modification that is to be made to the marker column when the transaction is submitted; and the submitting module 45 is configured to: when the transaction is submitted, make a corresponding modification to the marker column according to the recorded modification that is to be made to the marker column when the transaction is submitted, so that a value of a marker bit of each row in the modified marker column indicates validity of data that is located in a same row as the marker bit after the modification processing.

The interface module 41 is further configured to send a modification response to the application program.

Further, as shown in FIG. 5, the modifying module 43 of the processing device includes an updating unit 431, configured to: when the modification request is specifically an update request and the modification condition is specifically an update condition, query in the more than one data column for data that meets the update condition, where a value of a marker bit of a row in which the data meeting the update condition is located is valid; add a new row to the more than one data column and the marker column, where the quantity of new rows is the same as the quantity of to-be-updated rows in the update condition; copy, to the new row, data in a row holding the data which is in the more than one data column and meets the update condition is located, and set a value of a marker bit of the new row to be invalid; and modify to-be-updated data in the new row according to the update condition; and the recording module 44 is specifically configured to add a record indicating that when the transaction is submitted, the value of the marker bit of the row in which the data meeting the update condition is located needs to be modified to be invalid and the value of the marker bit of the new row needs to be modified to be valid.

Further, as shown in FIG. 5, the modifying module 43 of the processing device includes a row number processing unit 432, configured to: when the column-oriented database further includes a row number column and a row number of each row is stored in the row number column, set a row number of the new row as a row number of the row in which the data meeting the update condition is located.

Further, as shown in FIG. 5, the modifying module 43 of the processing device includes an inserting unit 433, configured to: when the modification request is specifically an insertion request and the modification condition is specifically an insertion condition, add a new row to the more than one data column and the marker column according to the insertion condition, where the quantity of new rows is the same as the quantity of to-be-inserted rows in the insertion condition; and add data to the new row, and set a marker bit of the new row to be invalid; and the recording module 44 is specifically configured to add a record indicating that when the transaction is submitted, a value of the marker bit of the new row needs to be modified to be valid.

Further, as shown in FIG. 5, the modifying module 43 of the processing device includes a deleting unit 434, configured to: when the modification request is specifically a deletion request and the modification condition is specifically a deletion condition, query in the more than one data column for data that meets the deletion condition; and the recording module 44 is configured to add a record indicating that when the transaction is submitted, a value of a marker bit of a row in which the data meeting the deletion condition is located needs to be modified to be invalid.

Figure 6:
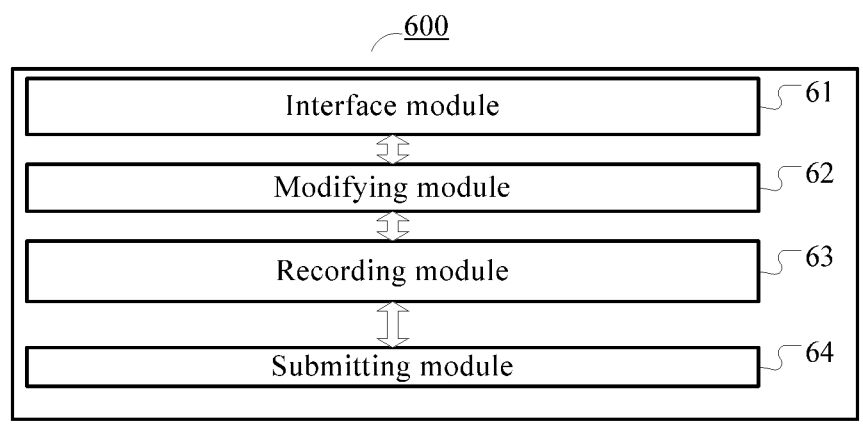
FIG. 6 is a schematic structural block diagram of another processing device according to an embodiment of the present invention.

As shown in FIG. 6, a processing device provided in this embodiment of the present invention includes an interface module 61, a modifying module 62, a recording module 63, and a submitting module 64, where:

the interface module 61 is configured to: receive, in a transaction, a modification request sent by an application program, where the modification request contains a modification condition for a column-oriented database, and send the modification request to the modifying module, where the column-oriented database includes a marker column and more than one data column, the data column is used to store specific data in a column store manner, and a value of a marker bit of each row in the marker column is used to indicate validity of data that is located in a same row as the marker bit;

the modifying module 62 is configured to apply modification processing to the marker column and the more than one data column according to the modification condition;

the recording module 63 is configured to record a modification that is to be made to the marker column when the transaction is submitted;

the submitting module 64 is configured to: when the transaction is submitted, make a corresponding modification to the marker column according to the recorded modification that is to be made to the marker column when the transaction is submitted, so that a value of a marker bit of each row in the modified marker column indicates validity of data that is located in a same row as the marker bit after the modification processing; and the interface module 61 is further configured to send a modification response to the application program.

Figure 7:
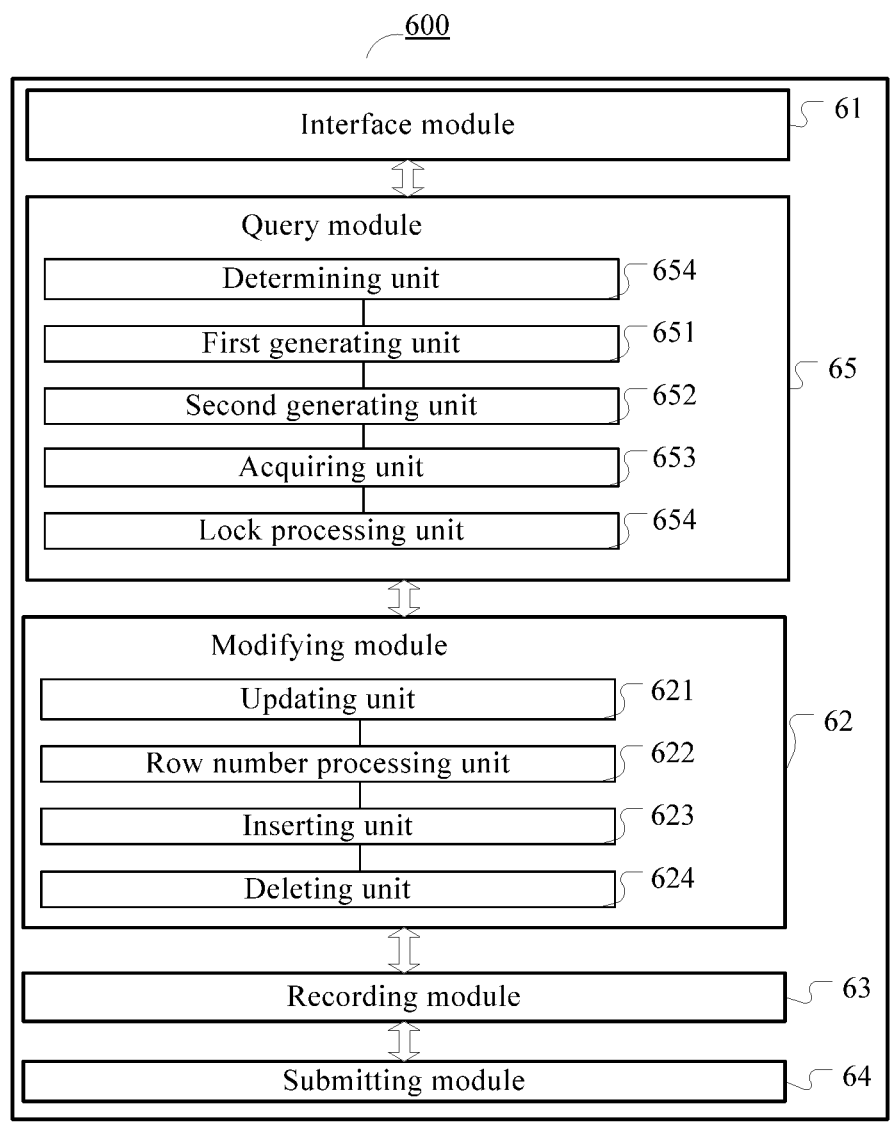
FIG. 7 is a schematic structural block diagram of still another processing device according to an embodiment of the present invention.

Further, as shown in FIG. 7, the modifying module 62 includes an updating unit 621, configured to: when the modification request is specifically an update request and the modification condition is specifically an update condition, query in the more than one data column for data that meets the update condition, where a value of a marker bit of a row in which the data meeting the update condition is located is valid; add a new row to the more than one data column and the marker column, where the quantity of new rows is the same as the quantity of to-be-updated rows in the update condition; copy, to the new row, data in the row holding the data which is in the more than one data column and meets the update condition is located, and set a value of a marker bit of the new row to be invalid; and modify to-be-updated data in the new row according to the update condition; and the recording module 63 is specifically configured to add a record indicating that when the transaction is submitted, the value of the marker bit of the row in which the data meeting the update condition is located needs to be modified to be invalid and the value of the marker bit of the new row needs to be modified to be valid.

Further, as shown in FIG. 7, the modifying module 62 includes a row number processing unit 622, configured to: when the column-oriented database further includes a row number column and a row number of each row is stored in the row number column, set a row number of the new row as a row number of the row in which the data meeting the update condition is located.

Further, as shown in FIG. 7, the modifying module 62 includes an inserting unit 623, configured to: when the modification request is specifically an insertion request and the modification condition is specifically an insertion condition, add a new row to the more than one data column and the marker column according to the insertion condition, where the quantity of new rows is the same as the quantity of to-be-inserted rows in the insertion condition; and add data to the new row, and set a marker bit of the new row to be invalid; and the recording module 63 is specifically configured to add a record indicating that when the transaction is submitted, a value of the marker bit of the new row needs to be modified to be valid.

Further, as shown in FIG. 7, the modifying module 62 includes a deleting unit 624, configured to: when the modification request is specifically a deletion request and the modification condition is specifically a deletion condition, query in the more than one data column for data that meets the deletion condition; and the recording module 63 is configured to add a record indicating that when the transaction is submitted, a value of a marker bit of a row in which the data meeting the deletion condition is located needs to be modified to be invalid.

Further, as shown in FIG. 7, the processing device further includes a query module 65, where the interface module 61 is further configured to: receive a query request sent by an application program, where the query request contains a query condition for the column-oriented database, send the query request to the query module, receive a query result sent by the query module, and send the query result to the application program.

The query module 65 is configured to: query the more than one data column according to the marker column and the query condition to obtain a query result that meets both the query condition and a requirement that a marker bit of the query result in the marker column is valid, and send the query result to the interface module.

Further, as shown in FIG. 7, the query module 65 includes a first generating unit 651, a second generating unit 652, and an acquiring unit 653, where:

the first generating unit 651 is configured to scan, according to the query condition, a data column involved in the query condition and generate conditional bitmap, where a row in the involved data column meets the query condition, a corresponding row in the conditional bitmap is assigned a valid value, and a row in the involved data column does not meet the query condition, a corresponding row in the conditional bitmap is assigned an invalid value;

the second generating unit 652 is configured to generate a query bitmap according to the marker column and the conditional bitmap, where when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and the acquiring unit 653 is configured to obtain, according to the query bitmap, the query result that meets both the query condition and a requirement that the marker bit of the query result in the marker column is valid.

Further, as shown in FIG. 7, the second generating unit 652 is specifically configured to: when the marker column is a bitmap, perform an AND operation on the marker column and the conditional bitmap to generate the query bitmap, where a value of a marker bit in the marker column, a value of each row in the conditional bitmap, and a value of each row in the query bitmap are 0 or 1.

Further, as shown in FIG. 7, the query module 65 further includes a determining unit 654, configured to: determine a modification that is to be made to the marker column when a transaction is submitted exists, where the transaction is a transaction in which the query request is located; store the marker column in a temporary storage area, use the stored marker column as a private marker column of the query request, and update the private marker column according to the modification that is to be made to the marker column when the transaction is submitted, so that a value of a modified marker bit in the updated private marker column indicates validity of data corresponding to the current marker bit in the transaction;

the second generating unit 652 is specifically configured to generate a query bitmap according to the updated private marker column and the conditional bitmap, where when a value of a same row in both the updated private marker column and the conditional bitmap is a valid value, a value of a same row in the query bitmap is valid, or when a value of a same row in the updated private marker column and that in the conditional bitmap are not both valid values, a value of a same row in the query bitmap is invalid; and the acquiring unit 653 is specifically configured to obtain, according to the query bitmap, a query result that meets both the query condition and a requirement that a marker bit of the query result in the updated private marker column is valid.

Further, the determining unit is further configured to: determine a modification that is to be made to the marker column when a transaction is submitted does not exist, where the transaction is a transaction in which the query request is located; when no shared marker column is stored in a temporary storage area or when a version number of a shared marker column that has been stored in the temporary storage area is different from a marker column version number in a table header, store, in the temporary storage area, a marker column version number and the marker column which are in a data storage area, use the stored marker column as another shared marker column, establish a correspondence between a version number of the another shared marker column and the query request, or when the version number of the stored shared marker column is the same as the marker column version number in the table header, establish a correspondence between the version number of the stored shared marker column and the query request;

the second generating unit is specifically configured to: determine, in the temporary storage area and according to the correspondence between the version number of the another or stored shared marker column and the query request, a shared marker column corresponding to the query request, and generate a query bitmap according to the conditional bitmap and the shared marker column corresponding to the query request, where when a value of a same row in both the shared marker column corresponding to the query request and the conditional bitmap is a valid value, a value of a same row in the query bitmap is valid, or when a value of a same row in the shared marker column corresponding to the query request and that in the conditional bitmap are not both valid values, a value of a same row in the query bitmap is invalid; and the acquiring unit is specifically configured to obtain, according to the query bitmap, a query result that meets both the query condition and a requirement that a marker bit of the query result in the shared marker column corresponding to the query request is valid.

Further, as shown in FIG. 7, the query module 65 further includes a lock processing unit 655, configured to add an exclusive lock to the marker column before the copying the marker column and release the exclusive lock for the marker column after the copying the marker column.

In this embodiment of the present invention, a marker column that is specially used to indicate validity of a numerical value of each row in a data column is added to a column-oriented database; in this way, various types of processing, including addition, deletion, and modification, can be completely implemented in a column-oriented store manner by using the marker column in the column-oriented database. Further, it is unnecessary to apply addition, deletion and modification processing in a special row area; consequently, when a data query is performed, the data query can be completely performed in a column area, which eliminates the need for a query in the row area and in turn improves the data query efficiency. The improvement would be noticeably significant in scenarios of big data. In addition, because the marker column is used to indicate validity of each row in the data column, it can also be implemented that a lock does not need to be added to each row of the data column when a data query is performed. In this way, operations such as addition, deletion, and modification can also be performed on data when a query is performed.

Figure 8:
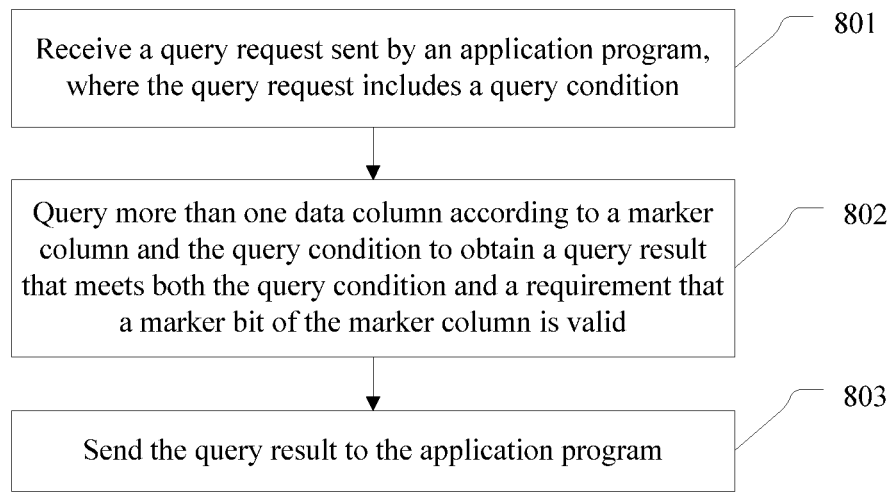
FIG. 8 is a flowchart of a column-oriented database processing method according to an embodiment of the present invention.

An embodiment of the present invention provides a column-oriented database processing method, where a column-oriented database in this embodiment of the present invention includes a marker column and more than one data column, the data column is used to store specific data in a column store manner, and a value of a marker bit each row in the marker column is used to indicate validity of data that is located in a same row as the marker bit. The method is shown in FIG. 8.

Step 801: Receive a query request sent by an application program, where the query request contains a query condition.

Step 802: Query the more than one data column according to the marker column and the query condition to obtain a query result that meets both the query condition and a requirement that a marker bit of the query result in the marker column is valid.

Specifically, scan, according to the query condition, a data column involved in the query condition, and conditional bitmap is generated, where a row in the involved data column meets the query condition, a corresponding row in the conditional bitmap is assigned a valid value, and a row in the involved data column does not meet the query condition, a corresponding row in the conditional bitmap is assigned an invalid value; generate a query bitmap according to the marker column and the conditional bitmap, where when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and obtain, according to the query bitmap, the query result that meets both the query condition and a requirement that the marker bit of the query result in the marker column is valid.

Herein, the marker column is a bitmap, and then, in this case, the generating a query bitmap according to the marker column and the conditional bitmap specifically includes: performing an AND operation on the marker column and the conditional bitmap to generate the query bitmap, where a value of a marker bit in the marker column, a value of each row in the conditional bitmap, and a value of each row in the query bitmap are 0 or 1.

Further, before the data column involved in the query condition is scanned according to the query condition, it may be further required to determine whether a modification that is to be made to the marker column when a transaction is submitted exists, where the transaction is a transaction in which the query request is located; if it is determined that the modification that is to be made to the marker column when the transaction is submitted exists, where the transaction is a transaction in which the query request is located, the marker column is stored in a temporary storage area, the stored marker column is used as a private marker column of the query request, and the private marker column is updated according to the modification that is to be made to the marker column when the transaction is submitted, so that a value of a modified marker bit in the updated private marker column indicates validity of data corresponding to the current marker bit in the transaction.

In this case, the step of generating a query bitmap according to the marker column and the conditional bitmap, where when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and obtaining, according to the query bitmap, the query result that meets both the query condition and a requirement that a marker bit of the query result in the marker column is valid is specifically: generating a query bitmap according to the updated private marker column and the conditional bitmap, where when a value of a same row in both the updated private marker column and the conditional bitmap is a valid value, a value of a same row in the query bitmap is valid, or when a value of a same row in the updated private marker column and that in the conditional bitmap are not both valid values, a value of a same row in the query bitmap is invalid; and obtaining, according to the query bitmap, a query result that meets both the query condition and a requirement that a marker bit of the query result in the updated private marker column is valid.

Further, when it is determined, according to the query condition, that a modification that is to be made to the marker column when a transaction is submitted does not exist, where the transaction is a transaction in which the query request is located, the method further includes: when no shared marker column is stored in a temporary storage area or when a version number of a shared marker column that has been stored in the temporary storage area is different from a marker column version number in a table header, store, in the temporary storage area, a marker column version number and the marker column which are in a data storage area, use the stored marker column as another shared marker column, establish a correspondence between a version number of the another shared marker column and the query request, or when the version number of the stored shared marker column is the same as the marker column version number in the table header, establish a correspondence between the version number of the stored shared marker column and the query request.

In this case, the step of generating a query bitmap according to the marker column and the conditional bitmap, where when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and obtaining, according to the query bitmap, the query result that meets both the query condition and a requirement that a marker bit of the query result in the marker column is valid is specifically: determining, in the temporary storage area and according to the correspondence between the version number of the another or stored shared marker column and the query request, a shared marker column corresponding to the query request, and generating a query bitmap according to the conditional bitmap and the shared marker column corresponding to the query request, where when a value of a same row in both the shared marker column corresponding to the query request and the conditional bitmap is a valid value, a value of a same row in the query bitmap is valid, or when a value of a same row in the shared marker column corresponding to the query request and that in the conditional bitmap are not both valid values, a value of a same row in the query bitmap is invalid; and obtaining, according to the query bitmap, a query result that meets both the query condition and a requirement that a marker bit of the query result in the shared marker column corresponding to the query request is valid.

Further, before the copying the marker column, the method further includes: adding an exclusive lock to the marker column; and after the copying the marker column, the method further includes: releasing the exclusive lock for the marker column.

Step 803: Send the query result to the application program.

The method further includes: receiving, in a transaction, a modification request sent by an application program, where the modification request contains a modification condition; the transaction and the foregoing query process may be within a same transaction, and if this is the case, the modification request may be prior to the query request, or may be subsequent to the query request; or the transaction and the foregoing query process may be within different transactions; applying modification processing to the marker column and the more than one data column according to the modification condition, and recording a modification that is to be made to the marker column when the transaction is submitted; when the transaction is submitted, making a corresponding modification to the marker column according to the recorded modification that is to be made to the marker column when the transaction is submitted, so that a value of a marker bit of each row in the modified marker column indicates validity of data that is located in a same row as the marker bit after the modification processing; and sending a modification response to the application program.

Specifically, if the modification request is specifically an update request and the modification condition is specifically an update condition, the step of applying modification processing to the marker column on the marker column and the more than one data column according to the modification condition and recording a modification that is to be made to the marker column when the transaction is submitted specifically includes: querying in the more than one data column for data that meets the update condition, where a value of a marker bit of a row in which the data meeting the update condition is located is valid; adding a new row to the more than one data column and the marker column, where the quantity of new rows is the same as the quantity of to-be-updated rows in the update condition; copying, to the new row, data in a row in which data in the more than one data column and meeting the update condition is located, and setting a value of a marker bit of the new row to be invalid; modifying to-be-updated data in the new row according to the update condition; and recording that when the transaction is submitted, the value of the marker bit of the row in which the data meeting the update condition is located needs to be modified to be invalid and the value of the marker bit of the new row needs to be modified to be valid.

If the column-oriented database further includes a row number column and a row number of each row is stored in the row number column, the method further includes: setting a row number of the new row as a row number of the row in which the data meeting the update condition is located.

When the modification request is specifically an insertion request and the modification condition is specifically an insertion condition, the step of applying modification processing to the marker column and the more than one data column according to the modification condition and recording a modification that is to be made to the marker column when the transaction is submitted specifically includes: adding a new row to the more than one data column and the marker column according to the insertion condition, where the quantity of new rows is the same as the quantity of to-be-inserted rows in the insertion condition; adding data to the new row, and setting a marker bit of the new row to be invalid; and recording that when the transaction is submitted, a value of the marker bit of the new row needs to be modified to be valid.

When the modification request is specifically a deletion request and the modification condition is specifically a deletion condition, the step of applying modification processing to the marker column and the more than one data column according to the modification condition and recording a modification that is to be made to the marker column when the transaction is submitted specifically includes: querying in the more than one data column for data that meets the deletion condition; and recording that when the transaction is submitted, a value of a marker bit of a row in which the data meeting the deletion condition is located needs to be modified to be invalid.

Figure 9:
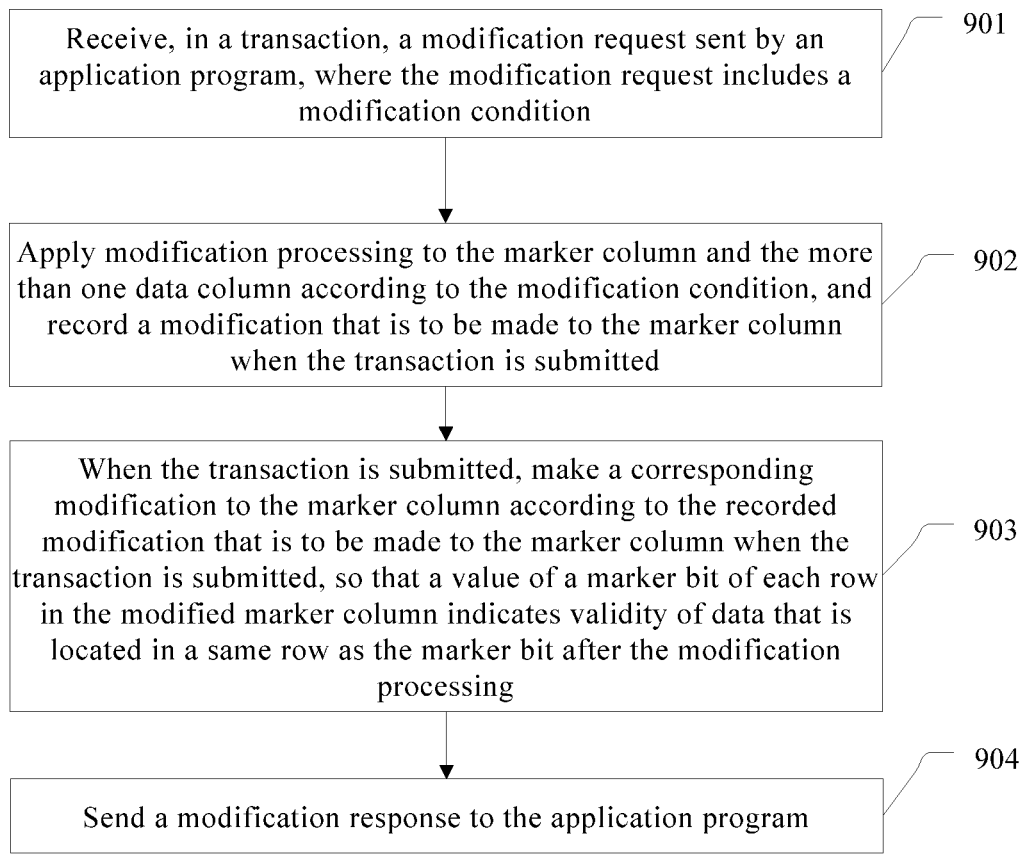
FIG. 9 is a flowchart of another column-oriented database processing method according to an embodiment of the present invention.

An embodiment of the present invention provides a column-oriented database processing method, where a column-oriented database in this embodiment of the present invention includes a marker column and more than one data column, the data column is used to store specific data in a column store manner, and a value of each row in the marker column is used to indicate validity of each row of data that is located in a same row as the marker bit. The method is shown in FIG. 9.

Step 901: Receive, in a transaction, a modification request sent by an application program, where the modification request contains a modification condition.

The modification request may be an insertion request or an update request, and correspondingly, the modification condition may separately be an insertion condition or an update condition.

Step 902: Apply modification processing to the marker column and the more than one data column according to the modification condition, and record a modification that is to be made to the marker column when the transaction is submitted.

When the modification condition is specifically an update condition, this step may include: query in the more than one data column for data that meets the update condition, where a value of a marker bit of a row in which the data meeting the update condition is located is valid; add a new row to the more than one data column and the marker column, where the quantity of new rows is the same as the quantity of to-be-updated rows in the update condition; copy, to the new row, data in the row holding the data which is in the more than one data column and meets the update condition is located, and set a value of a marker bit of the new row to be invalid; modify to-be-updated data in the new row according to the update condition; and add a record indicating that when the transaction is submitted, the value of the marker bit of the row in which the data meeting the update condition is located needs to be modified to be invalid and the value of the marker bit of the new row needs to be modified to be valid.

The foregoing update process further includes: set a row number of the new row as a row number of the row in which the data meeting the update condition is located.

When the modification request is specifically an insertion request, this step may include: add a new row to the more than one data column and the marker column according to the insertion condition, where the quantity of new rows is the same as the quantity of to-be-inserted rows in the insertion condition; add data to the new row, and set a marker bit of the new row to be invalid; and add a record indicating that when the transaction is submitted, a value of the marker bit of the new row needs to be modified to be valid.

Step 903: When the transaction is submitted, make a corresponding modification to the marker column according to the recorded modification that is to be made to the marker column when the transaction is submitted, so that a value of a marker bit of each row in the modified marker column indicates validity of data that is located in a same row as the marker bit after the modification processing.

Step 904: Send a modification response to the application program.

The foregoing solution further includes a query process. The query process is the same as in the embodiment shown in FIG. 8, and details are not described herein again.

In this embodiment of the present invention, a marker column that is specially used to indicate validity of a numerical value of each row in a data column is added to a column-oriented database; in this way, various types of processing, including addition, deletion, and modification, can be completely implemented in a column-oriented store manner by using the marker column in the column-oriented database. Further, it is unnecessary to apply addition, deletion and modification processing in a special row area; consequently, when a data query is performed, the data query can be completely performed in a column area, which eliminates the need for a query in the row area and in turn improves the data query efficiency. The improvement is noticeably significant in scenarios of big data. In addition, because the marker column is used to indicate validity of each row in the data column, it can also be implemented that a lock does not need to be added to each row of the data column when a data query is performed. In this way, operations such as addition, deletion, and modification can also be performed on data when a query is performed.

For example, in an actual test, it takes 2757 us to scan 40 million rows of data, where each row contains three fields and each field has eight bytes, and scanning every 10000 rows of data takes 0.68925 us. However, when data stored in a row store manner is scanned in a row scanning manner and a same table structure is employed, scanning 10 million rows of data needs 3081376 us, and the amount of time for scanning every 10000 rows of data reaches 308.1376 us. The column scanning efficiency is 447 times higher than the row scanning efficiency. It can be fully proven from the test that the query efficiency of a column-oriented database is much higher than the query efficiency of a row-oriented database. Furthermore, in the present invention, a marker column is used to control multiple versions of a database, which exhibits ease of control, high convenience, and improvement in the addition, deletion, modification, and query efficiency of the database.

Figure 10:
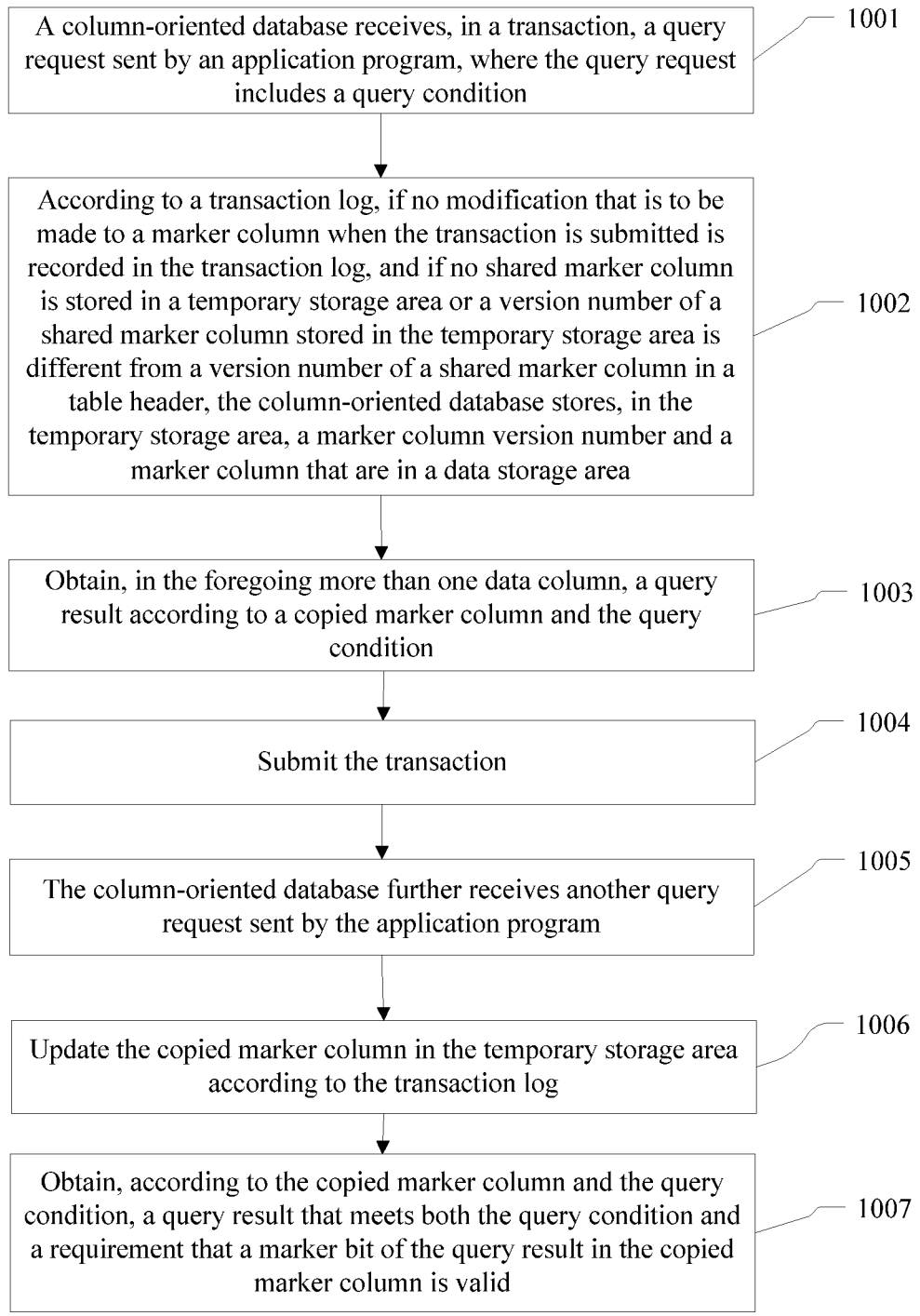
FIG. 10 is a flowchart of a method for querying data in a column-oriented database according to an embodiment of the present invention.

As shown in FIG. 10, an embodiment of the present invention provides a method for querying a column-oriented database, including:

Step 1001: A column-oriented database receives, in a transaction, a query request sent by an application program, where the query request contains a query condition.

For example, the query request is an SQL1, for example, select F2 from Table1 where F3>15, and Table 1 in this embodiment of the present invention is used to indicate Table1 herein.

Step 1002: The column-oriented database determines, according to a transaction log, whether a modification that is to be made to a marker column when the transaction is submitted is recorded in the transaction log; if a modification that is to be made to the marker column when the transaction is submitted is not recorded in the transaction log, determines whether a shared marker column is stored in a temporary storage area; if no shared marker column is stored in the temporary storage area or a version number of the shared marker column stored in the temporary storage area is different from a version number of a shared marker column in a table header, stores, in the temporary storage area, a marker column version number and the marker column which are in a data storage area, uses the stored marker column as another shared marker column, and establishes a correspondence between a version number of the another shared marker column and the query request, for example, associates the version number of the shared marker column with the query request by using a slider; or if the version number of the stored shared marker column is the same as the marker column version number in the table header, establishes a correspondence between the version number of the stored shared marker column and the query request. The shared marker column herein refers to a marker column that can be directly used by another query request in a same transaction or a query request in another transaction to request a query. The marker column may be set to be public, so that the marker column is a shared marker column. There are multiple ways to set the marker column to be public. One way is to set an attribute of the marker column to a public attribute; another alternative way is to set up two areas in the temporary storage area, where one area is a public area, the other is a private area, and then store a shared marker column in the public area. If a modification that is to be made to the marker column when the transaction is submitted is recorded in the transaction log, the marker column is first copied to the temporary storage area and is set to be private so that it will be used as a private marker column. The private marker column is effective only for this query request, and the marker column cannot be directly used for query by another query request in a same transaction or a query request in another transaction. There are multiple ways to set a private marker column. One way is to set an attribute of the marker column to a private attribute; an alternative way is to set up two areas in the temporary storage area, where one area is a public area, the other is a private area, and then store the private marker column in the private area. The private marker column is updated according to the modification that is to be made to the marker column when the transaction is submitted, so that a value of a modified marker bit in the updated private marker column indicates validity of data corresponding to the current marker bit in the transaction.

A specific example is as follows: the current transaction has not been submitted, and therefore it may be required to determine whether modification processing on data in the data column already exists in the current transaction. The column-oriented database queries the transaction log. If the current transaction log does not contain a record indicating that a value of a marker bit of a row or values of marker bits of several rows need to be modified when the current transaction is to be submitted, it is inferred that no modification processing is performed on the data in the data column within the context of the current transaction, which means that the current marker column is accurate for this SQL1. Therefore, a current entry count is read, the marker column in the data storage area is scanned according to the current entry count, the current marker column is copied to the temporary storage area, and the current marker column is used as the private marker column. Referring back to the example of the foregoing specific SQL1 in this embodiment of the present invention, the column-oriented database makes one copy of the marker column, and the private marker column is shown in Table 3.

TABLE 3

| |
|---|
| 1 |
| 1 |
| 1 |
| 1 |

If the transaction log contains a record indicating that a value of a marker bit of a row or values of marker bits of several rows in the marker column need to be modified when the current transaction is to be submitted, it is inferred that modification processing on the data in the data column already exists in the current transaction, which means that the current transaction has not been submitted. In this case, data validity indicated by the private marker column is inaccurate for SQL1. Therefore, the column-oriented database first reads the current entry count, scans the current marker column according to the current entry count, copies the current marker column to the temporary storage area, and uses the current marker column as a private marker column; and makes one copy of the current marker column, modifies a value of a marker bit of a row or values of marker bits of several rows in the marker column in the temporary storage area, namely, updates the private marker column, according to a record in the transaction log.

Before the marker column is copied, a lock needs to be added to the marker column, so as to prevent another transaction from updating the marker column in the copying process and in turn avoids an incorrect query result. After the marker column is copied, the lock further needs to be released in time, so that update processing on the marker column by another transaction is not affected, and transactions can be processed concurrently.

It is assumed that, the current transaction has been processed but the following operation has not been submitted: delete from Table1 where F2=b. In this case, the transaction log contains the following record: When the transaction is submitted, a marker bit with a row number 2 is to be modified to 0. Apparently, the record may take various formats, for example, the record may be a text description, an XML description, or a tabular description. Referring back to the example of the foregoing specific SQL1 in this embodiment of the present invention, after the column-oriented database makes one copy of the marker column as shown in Table 3, the marker column with a row number 2 further needs to be modified to 0 according to the record in the transaction log, and the updated private marker column is stored as a copied marker column, as shown in Table 4.

TABLE 4

| |
|---|
| 1 |
| 0 |
| 1 |
| 1 |

If the marker column is shareable, when it is determined that a version number stored temporarily in the temporary storage area is different from the version number in the current table header and the version number is not being used by a query request, the marker column in the temporary storage area may be deleted; however, when the stored marker column is private and after a query request using the marker column is processed, the marker column in the temporary storage area is directly deleted.

Step 1003: Obtain, in the more than one data column and according to the copied marker column and the query condition, a query result that meets both the query condition and a requirement that a marker bit of the query result in the copied marker column is valid.

Specifically, the column-oriented database scans, according to the received query condition, a column involved in the query condition to obtain a conditional bitmap, where in the bitmap, a value of a row meeting the condition is 1 and a value of a row not meeting the condition is 0. Referring back to the example of the foregoing specific SQL1 in this embodiment of the present invention, two rows meet the condition F3=30, and a conditional bitmap shown in Table 5 is obtained.

TABLE 5

| |
|---|
| 0 |
| 1 |
| 1 |
| 0 |

Figure 11:
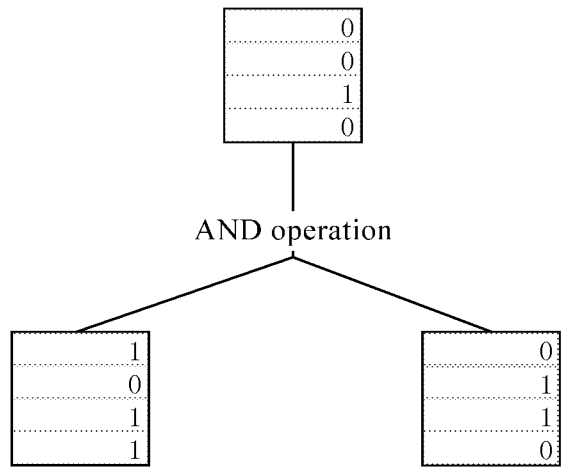
FIG. 11 is a schematic diagram of an AND operation performed on a conditional bitmap and a marker column according to an embodiment of the present invention.

The copied marker column shown in Table 4 is also a bitmap. In this case, the column-oriented database performs an AND operation on a bitmap of the temporarily stored marker column and the conditional bitmap, so as to obtain a query bitmap, where the query bitmap may indicate which row meets the query condition. An AND operation process is shown in FIG. 11. In this example, a query bitmap shown in Table 6 is obtained, after an AND operation is performed on the bitmap of the temporarily stored marker column shown in Table 4 and the conditional bitmap shown in Table 5.

TABLE 6

| |
|---|
| 0 |
| 0 |
| 1 |
| 0 |

A final query result may be obtained according to the query bitmap and the query condition. In this example, the query result is data in the 3rd row, namely, the obtained query result is c.

After the query request is fulfilled, the marker column copied and stored in the temporary storage area may be deleted.

Step 1004: Submit the transaction, and send the query result to the application program. In this way, a query request process is complete.

If all values in the marker column are 0, namely, data in each row is currently invalid, a query result indicating that no match is found can be directly output, without a need to perform a query. If all values in the marker column are 1, namely, data in each row is currently valid, an AND operation does not need to be performed on the conditional bitmap and the marker column, and the conditional bitmap is the query bitmap.

After the foregoing query process and before submission of the transaction, another query request process may also exist in the transaction, and the process includes:

Step 1005: The column-oriented database further receives another query request sent by an application program, where the query request contains a query condition.

For example, the query request is an SQL2, for example, select F3 from Table1 where (F2=b or F2=d).

Step 1006: It has been determined in step 1002 that the modification that is to be made to the marker column when the transaction is submitted has been recorded in the transaction log, and therefore the column-oriented database copies the current marker column and a version number of the current marker column to the temporary storage area, and update the copied marker column in the temporary storage area according to the transaction log.

Assume that the marker column has been modified in another transaction at this time and a version number of the modified marker column is v4, the modified marker column is shown in Table 7.

TABLE 7

| |
|---|
| 0 |
| 1 |
| 1 |
| 1 |

According to the assumption in step 1002, the transaction log at this time records: When the transaction is submitted, a marker bit with a row number 2 is to be modified to 0. Therefore, according to the transaction log, a value of the marker column with a row number 2, as shown in Table 7, is modified to 0, and the updated marker column is stored as the copied marker column, as shown in Table 8.

TABLE 8

| |
|---|
| 0 |
| 0 |
| 1 |
| 1 |

Step 1007: Obtain, in the more than one data column and according to the copied marker column and the query condition, a query result that meets both the query condition and a requirement that a marker bit of the query result in the copied marker column is valid.

Specifically, the column-oriented database scans, according to the received query condition, a column involved in the query condition to obtain a conditional bitmap, where in the bitmap, a value of a row meeting the condition is 1 and a value of a row not meeting the condition is 0. Referring back to the example of the foregoing specific SQL2 in this embodiment of the present invention, two rows meet the condition F2=b or d, and a conditional bitmap shown in Table 9 is obtained.

TABLE 9

| |
|---|
| 0 |
| 1 |
| 0 |
| 1 |

The copied marker column shown in Table 8 is also a bitmap. In this case, the column-oriented database performs an AND operation on the bitmap of the copied marker column and the conditional bitmap, so as to obtain a query bitmap, where the query bitmap may indicate which row meets the query condition. After the AND operation is performed on the bitmap of the temporarily stored marker column shown in Table 8 and the conditional bitmap shown in Table 9, a query bitmap shown in Table 10 is obtained.

TABLE 10

| |
|---|
| 0 |
| 0 |
| 0 |
| 1 |

A final query result may be obtained according to the query bitmap and the query condition. In this example, the query result is data in the 4th row, namely, the query result obtained is 10.

In the technical solution in this embodiment of the present invention, when a data query is performed, a marker column is used to indicate whether data of each row in a data column is valid; in this way, a column-oriented query can be performed fast and accurately.

Figure 12:
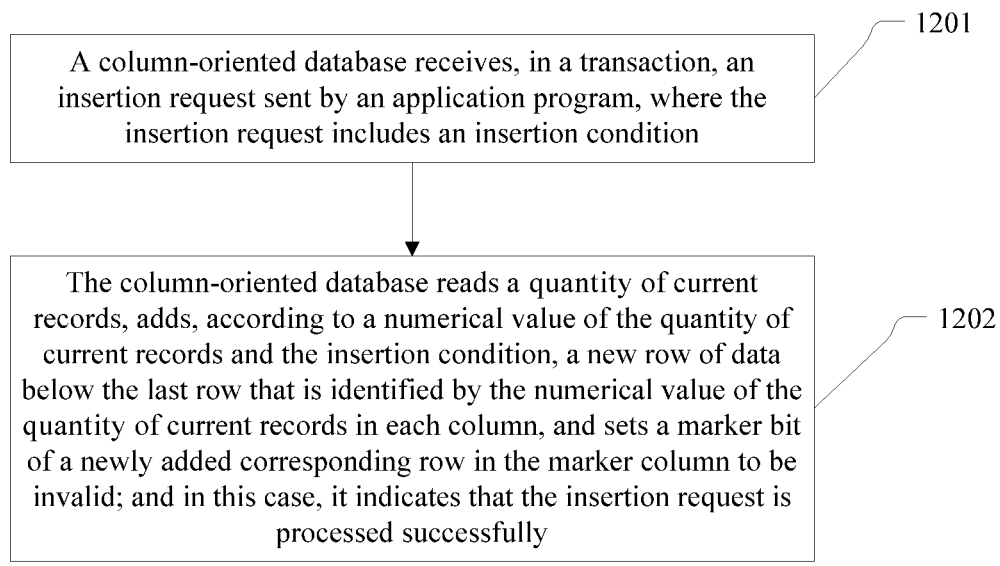
FIG. 12 is a flowchart of a method for inserting data into a column-oriented database according to an embodiment of the present invention.

As shown in FIG. 12, the present invention further provides a column-oriented database insertion processing solution, including:

Step 1201: A column-oriented database receives, in a transaction, an insertion request sent by an application program, where the insertion request contains an insertion condition.

Step 1202: The column-oriented database reads a current entry count, adds, according to the current entry count and the insertion condition, a new row of data below the last row in each column, where a row number of the last row is equal to the current entry count, sets a marker bit of the newly added corresponding row in the marker column to be invalid, for example, a numerical value of the marker bit is 0, and in a transaction log, adds a record indicating when the transaction is submitted, the marker bit of the newly added corresponding row is to be modified to be valid. In an implementation process, the row whose marker bit needs to be modified may be recorded in the transaction log by recording an address of the newly added corresponding row, and the address of the newly added corresponding row may be a location number, where the location number refers to a location sequence of a row in the column-oriented database. For example, 10 rows of data are stored in a column-oriented manner, and a location sequence of the 1st row to the 10th row may be 0 to 9 sequentially. A location of any row can be calculated, providing that a start location of the 1st row and a location size occupied by each row are known. In this way, a location number may be used to locate a specific location.

When the transaction is submitted successfully, the value of the marker bit is modified to 1 according to the record in the transaction log. In this case, it indicates that the insertion request is processed successfully. If the insertion request herein contains several pieces of to-be-inserted data, for example, N pieces of to-be-inserted data, the column-oriented database may sequentially insert N rows of data below the last row in each data column, where a row number of the last row is equal to the current entry count. A numerical value of a marker bit of each newly added row is 0; each time a row is added, the current entry count increases by 1. An insertion result, namely, a response message that insertion is successful, is returned to the application program.

For example, the insertion request is specifically an SQL2, for example, insert into Table1 (F2, F3) values (e, 15); it is first learned that the current entry count is 4, a new row is added below the 4$^{th}$ row of each column in Table 1, a value of a marker bit of the new row in the marker column is invalid, values of the data columns F2 and F3 are e and 15 respectively, and a row number of the new row is set to 5. Generally, a row number of a new row is a maximum row number before addition plus 1, so as to ensure that the row number of the new row is unique. In addition, the current entry count increases by 1 to become 5, which is shown in Table 11.

TABLE 11

| 1 | 1 | a | 10 |
|---|---|---|----|
| 2 | 1 | b | 30 |
| 3 | 1 | c | 30 |
| 4 | 1 | d | 10 |
| 5 | 0 | e | 15 |

That a modification needs to be made to the marker column when the transaction is submitted is recorded in the transaction log.

After the transaction is submitted successfully, the value of the marker bit of the new row is modified to 1 according to the record in the transaction log. In this way, processing of the insertion operation is completed, as shown in Table 12.

TABLE 12

| 1 | 1 | a | 10 |
|---|---|---|----|
| 2 | 1 | b | 30 |
| 3 | 1 | c | 30 |
| 4 | 1 | d | 10 |
| 5 | 1 | e | 15 |

Figure 13:
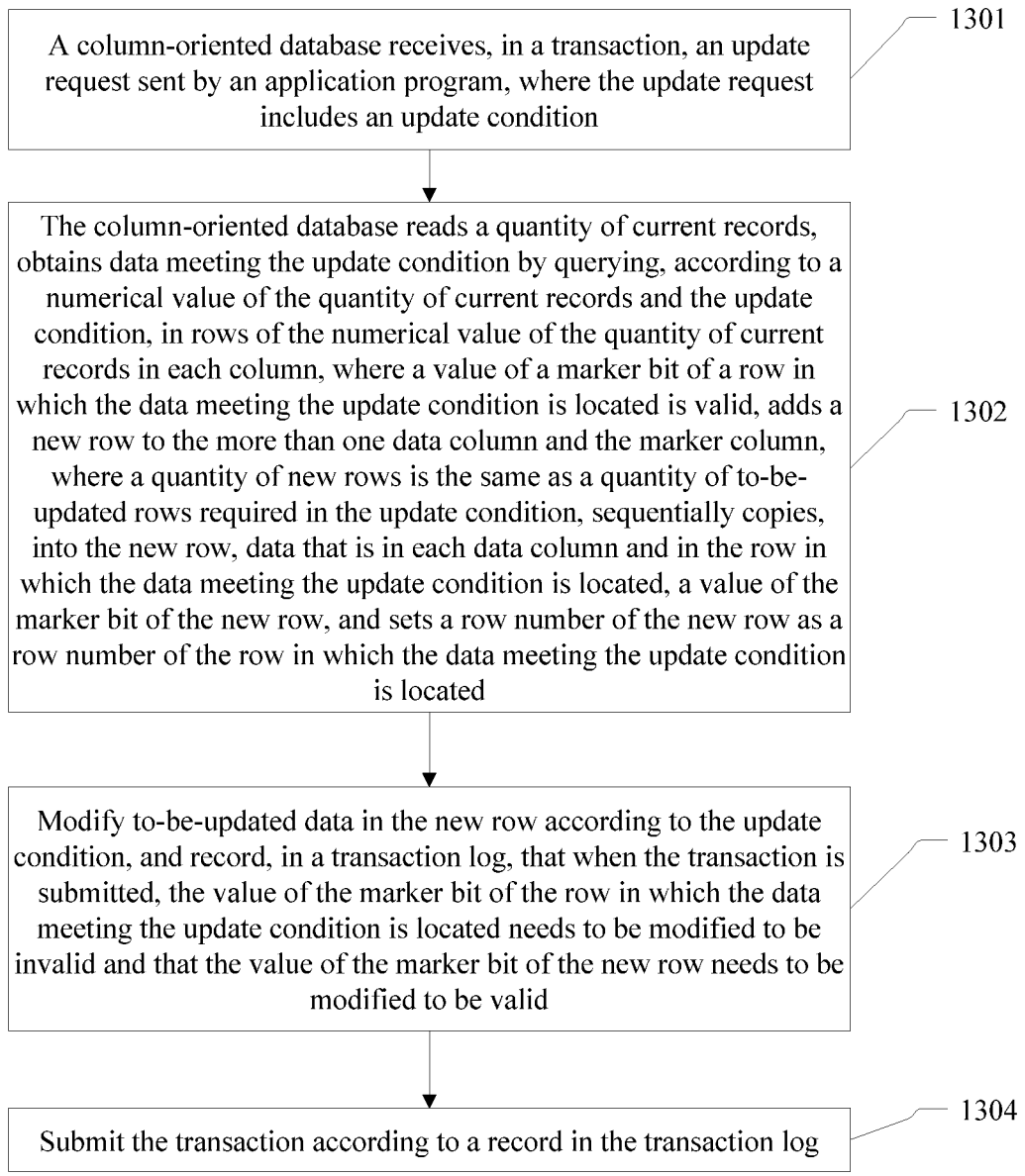
FIG. 13 is a flowchart of a method for updating data in a column-oriented database according to an embodiment of the present invention.

As shown in FIG. 13, the present invention further provides a column-oriented database update processing solution, including:

Step 1301: A column-oriented database receives, in a transaction, an update request sent by an application program, where the update request contains an update condition.

Step 1302: The column-oriented database reads a current entry count, queries, according to the current entry count and the update condition, in rows in each column for data that meets the update condition, where the quantity of queried rows is equal to the current entry count and a value of a marker bit of a row in which the data meeting the update condition is located is valid; adds a new row to more than one data column and the marker column, where the quantity of new rows is the same as the quantity of to-be-updated rows in the update condition; sequentially copies, to the new row, data that is in each data column of the row in which the data meeting the update condition is located, sets a value of the marker bit of the new row to be invalid, and sets a row number of the new row as a row number of the row in which the data meeting the update condition is located.

Specifically, for example, the update request is specifically SQL3, update table1 set F3=20 where F2=c. The column-oriented database scans a table table1 and queries for an entry in which a value in the column F2 is c. A value of each data column in the row in which the entry is located is copied to each data column at the end of the table table1 to form a new row, a value of a marker bit in the marker column in which the new row is located is set to 0, and a row number of the new row is set to 3, where a value of each data column in this row is a value in the queried row in which the value in the column F2 is c, as shown in Table 13.

TABLE 13

| 1 | 1 | a | 10 |
| 2 | 1 | b | 30 |
| 3 | 1 | c | 30 |
| 4 | 1 | d | 10 |
| 3 | 0 | c | 30 |

Herein, the process of reading, according to the update condition, the data meeting the update condition is actually a query process, and a principle of the query process is the same as in the embodiment in FIG. 10.

Step 1303: Modify to-be-updated data in the new row according to the update condition, and add record to a transaction log to indicate that when the transaction is submitted, the value of the marker bit of the row in which the data meeting the update condition is located needs to be modified to be invalid and the value of the marker bit of the new row needs to be modified to be valid.

Specifically, for example, the column-oriented database updates, according to the update condition set F3=20 where F2=c, a value of the data column F3 in the new row from 30 to 20 and increases the maximum current entry count by 1 to 5, each column after the updating is shown in Table 14.

TABLE 14

| 1 | 1 | a | 10 |
| 2 | 1 | b | 30 |
| 3 | 1 | c | 30 |
| 4 | 1 | d | 10 |
| 3 | 0 | c | 20 |

Step 1304: Submit the transaction according to the record in the transaction log; in this case, modify the value of the marker bit of the row in which the data meeting the update condition is located to be invalid, and modify the value of the marker bit of the new row to be valid; and return an update result, namely, a response message indicating that update is successful, to the application program.

For example, the column-oriented database submits the current transaction, and when the transaction is submitted, adds an exclusive lock to the marker column, and modifies the marker bits of the rows recorded in the transaction log, namely, modifies the marker bit of the row in which F2=c and F3=30 to 0 and modifies the marker bit of the row in which F2=c and F3=20 to 1. After submission is successful, new data takes effect, and old data becomes invalid. After the submission, the exclusive lock is released for the marker column. Data after the submission is shown in Table 15.

TABLE 15

| 1 | 1 | a | 10 |
| 2 | 1 | b | 30 |
| 3 | 0 | c | 30 |
| 4 | 1 | d | 10 |
| 3 | 1 | c | 20 |

Figure 14:
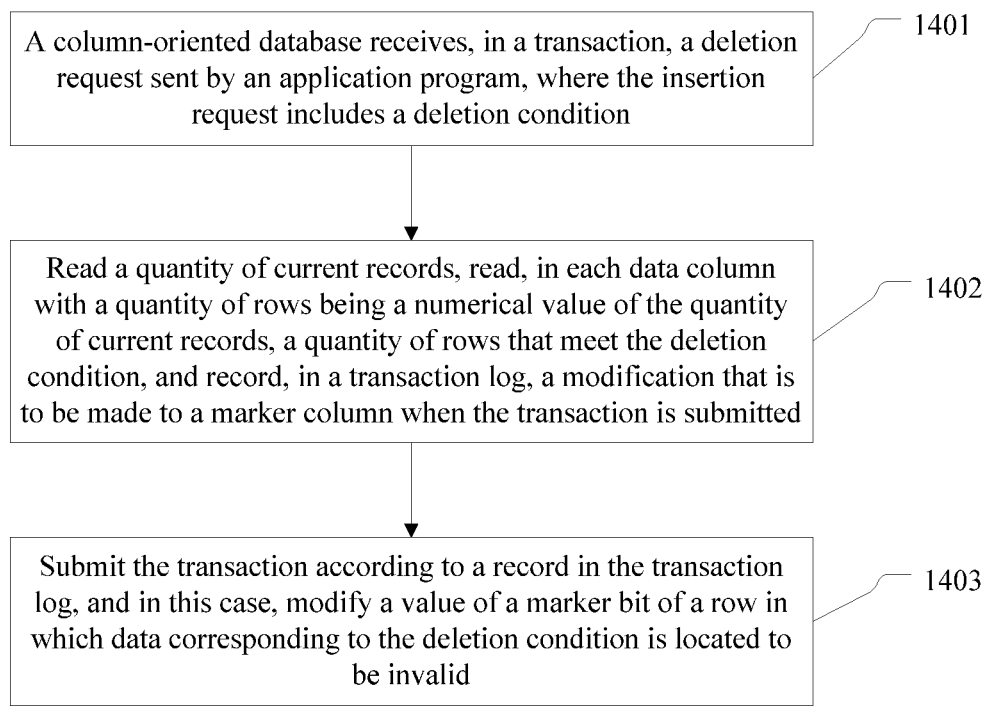
FIG. 14 is a flowchart of a method for deleting data from a column-oriented database according to an embodiment of the present invention.

As shown in FIG. 14, the present invention further provides a column-oriented database deletion processing solution, including:

Step 1401: A column-oriented database receives, in a transaction, a deletion request sent by an application program, where the deletion request contains a deletion condition.

Step 1402: Read a current entry count, and in each data column of rows whose quantity is equal to the current entry count, read a row number of a row that meets the deletion condition, and record in a transaction log a modification that is to be made to a marker column when the transaction is submitted.

Herein, the process of reading a to-be-deleted row according to the deletion condition is actually a query process, and a principle of the query process is the same as in the embodiment in FIG. 10.

Step 1403: Submit the transaction according to the record in the transaction log, and in this case, modify a value of a marker bit of a row in which data corresponding to the deletion condition is located to be invalid; and return a deletion result, namely, a response message indicating that deletion is successful, to the application program.

For example, the deletion request is specifically SQL4, delete from table1 where F2=c. Then, the foregoing deletion process is as follows: According to the deletion condition, a record is added to the transaction log to indicate that when the transaction is submitted successfully, a marker bit of a row in which a value of the data column F2 in Table 1 is c is to be modified to be invalid. Then, when the transaction is submitted, deletion processing is performed according to the record in the transaction log. A result after deletion is shown in Table 16. Because no new row of data is added, the current entry count remains unchanged.

TABLE 16

| 1 | 1 | a | 10 |
| 2 | 1 | b | 30 |
| 3 | 0 | c | 30 |
| 4 | 1 | d | 10 |

When a column-oriented database performs query, deletion, or update processing, it may be required to execute a process of querying a data column meeting a deletion condition or an update condition; because a marker column in the database may change constantly, the marker column and a marker column version number need to be copied to a temporary cache area during each query. A specific query process is shown in the embodiment corresponding to FIG. 10.

Persons of ordinary skill in the art may understand that all or a part of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A computer-implemented method for processing a database query, comprising:
    receiving and processing via at least one processor, a query request for accessing a column-oriented database sent by an application program, wherein the column-oriented database comprises a marker column and more than one data column, and the data column is used to store specific data in a column store manner, a value of a marker bit of each row in the marker column is used to indicate validity of data that is located in a same row as the marker bit in the more one data column, and further wherein the query request contains a query condition;
    scanning, according to the query condition, a data column specified by the query condition and generating conditional bitmap, wherein, when a row in the involved data column meets the query condition, a corresponding row in the conditional bitmap is assigned a valid value, and when a row in the involved data column does not meet the query condition, a corresponding row in the conditional bitmap is assigned an invalid value;
    generating a query bitmap according to the marker column and the conditional bitmap, when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid;
    obtaining, according to the query bitmap, a query result that meets both the query condition and a requirement that the marker bit of the query result in the marker column is valid; and
    sending the query result to the application program.

2. The method according to claim 1 comprising:
    determining, before the scanning, a query condition exists and that access to a data column is required to process the query condition;
    determining a modification that is to be made to the marker column when a transaction is submitted exists;
    storing the marker column in a temporary storage area;
    using the stored marker column as a private marker column of the query request; and
    updating the private marker column according to the modification that is to be made to the marker column when the transaction is submitted.

3. The method of claim 2, wherein the generating step further comprises:
    generating a query bitmap according to the updated private marker column and the conditional bitmap, when a value of a same row in both the updated private marker column and the conditional bitmap is a valid value, a value of a same row in the query bitmap is valid, or when a value of a same row in the updated private marker column and that in the conditional bitmap are not both valid values, a value of a same row in the query bitmap is invalid; and
    obtaining, according to the query bitmap, a query result that meets both the query condition and a requirement that a marker bit of the query result in the updated private marker column is valid.

4. The method according to claim 1, comprising:
    determining, before the scanning, a query condition exists and that access to a data column is required to process the query condition;
    determining a modification that is to be made to the marker column when a transaction is submitted does not exist;
    storing, in the temporary storage area, a marker column version number and the marker column which are in a data storage area when no shared marker column is stored in a temporary storage area or when a version number of a shared marker column that has been stored in the temporary storage area is different from a marker column version number in a table header;
    using the marker column stored in the temporary storage area as another shared marker column; and
    setting a correspondence between a version number of the another shared marker column and the query request.

5. The method of claim 4, wherein the generating step further comprises:
    determining, in the temporary storage area and according to the correspondence between the version number of the another or stored shared marker column and the query request, a shared marker column corresponding to the query request;
    generating a query bitmap according to the conditional bitmap and the shared marker column that is corresponding to the query request; and
    obtaining, according to the query bitmap, a query result that meets both the query condition and a requirement that a marker bit of the query result in the shared marker column corresponding to the query request is valid when a value of a same row in both the shared marker column corresponding to the query request and the conditional bitmap is a valid value and a value of a same row in the query bitmap is valid, or when a value of a same row in the shared marker column corresponding to the query request and that in the conditional bitmap are not both valid values and a value of a same row in the query bitmap is invalid.

6. The method according to claim 1, further comprising:
    receiving, in a transaction, a modification request sent by an application program, containing a modification condition;
    changing the marker column and the more than one data column according to the modification condition;
    recording a modification that is to be made to the marker column when the transaction is submitted;

making a corresponding modification to the marker column according to the recorded modification that is to be made to the marker column when the transaction is submitted when no shared marker column is stored in a temporary storage area or when a version number of a shared marker column that has been stored in the temporary storage area is different from a marker column version number in a table header; and sending a modification response to the application program.

7. The method according to claim 6, wherein the changing step further comprises:

querying in the more than one data column for data that meets an update condition, wherein a value of a marker bit of a row in which the data meeting the update condition is located is valid;

adding a new row to the more than one data column and the marker column, the quantity of new rows is the same as the quantity of to-be-updated rows in the update condition;

copying, to the new row, data in a row in which data in the more than one data column and meeting the update condition is located;

setting a value of a marker bit of the new row to be invalid;

modifying to-be-updated data in the new row according to the update condition; and recording that when the transaction is submitted, the value of the marker bit of the row in which the data meeting the update condition is located needs to be modified to be invalid and the value of the marker bit of the new row needs to be modified to be valid.

8. The method according to claim 6, wherein the changing step further comprises:

adding a new row to the more than one data column and the marker column according to the insertion condition, wherein the quantity of new rows is the same as the quantity of to-be-inserted rows in the insertion condition;

adding data to the new row, and setting a marker bit of the new row to be invalid; and recording that when the transaction is submitted, a value of the marker bit of the new row needs to be modified to be valid.

9. A computer-implemented method for processing a database query, comprising:

receiving and processing via at least one processor, in a transaction, a modification request sent by an application program, wherein the modification request contains a modification condition, the column-oriented database that comprises a marker column and more than one data column, and the data column is used to store specific data in a column store manner, a value of a marker bit of each row in the marker column is used to indicate validity of data that is located in a same row as the marker bit in the more one data column;

changing the marker column and the more than one data column according to the modification condition;

recording a modification that is to be made to the marker column when the transaction is submitted; and making a corresponding modification to the marker column according to the recorded modification that is to be made to the marker column when the transaction is submitted.

10. The method according to claim 9, wherein the changing step further comprises:

querying in the more than one data column for data that meets an update condition in a row having a valid marker bit;

adding a new row to the more than one data column and the marker column, wherein the quantity of new rows is the same as the quantity of to-be-updated rows in the update condition;

copying, to the new row, data in a row in which data in the more than one data column and meeting the update condition is located;

setting a value of a marker bit of the new row to be invalid;

modifying to-be-updated data in the new row according to the update condition; and recording that when the transaction is submitted, the value of the marker bit of the row in which the data meeting the update condition is located needs to be modified to be invalid and the value of the marker bit of the new row needs to be modified to be valid.

11. The method according to claim 9, wherein the changing step further comprises:

adding a new row to the more than one data column and the marker column according to the insertion condition, wherein the quantity of new rows is the same as the quantity of to-be-inserted rows in the insertion condition;

adding data to the new row, and setting a marker bit of the new row to be invalid; and recording that when the transaction is submitted, a value of the marker bit of the new row needs to be modified to be valid.

12. The method according to claim 9, further comprising:

receiving a query request sent by an application program, wherein the query request contains a query condition;

querying the more than one data column according to the marker column and the query condition to obtain a query result that meets both the query condition and a requirement that a marker bit of the query result in the marker column is valid; and sending the query result to the application program.

13. The method according to claim 12, wherein the querying step further comprises:

scanning, according to the query condition, a data column involved in the query condition and generating conditional bitmap, when a row in the involved data column meets the query condition, a corresponding row in the conditional bitmap is assigned a valid value, and when a row in the involved data column does not meet the query condition, a corresponding row in the conditional bitmap is assigned an invalid value;

generating a query bitmap according to the marker column and the conditional bitmap, when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid; and obtaining, according to the query bitmap, the query result that meets the query condition.

14. The method according to claim 12, comprising:

determining, before the scanning, query condition exists and that access to a data column is required to process the query condition;

determining a modification that is to be made to the marker column when a transaction is submitted exists;

storing the marker column in a temporary storage area;

using the stored marker column as a private marker column of the query request; and updating the private marker column according to the modification that is to be made to the marker column when the transaction is submitted.

15. The method of claim 14, wherein the generating step further comprises:

generating a query bitmap according to the updated private marker column and the conditional bitmap when a value of a same row in both the updated private marker column and the conditional bitmap is a valid value and a value of a same row in the query bitmap is valid, or when a value of a same row in the updated private marker column and that in the conditional bitmap are not both valid values and a value of a same row in the query bitmap is invalid; and obtaining, according to the query bitmap, a query result that meets both the query condition and a requirement that a marker bit of the query result in the updated private marker column is valid.

16. The method according to claim 12, comprising:

determining, before the scanning, a query condition exists and that access to a data column is required to process the query condition;

determining a modification that is to be made to the marker column when a transaction is submitted does not exist;

storing, in the temporary storage area, a marker column version number and the marker column which are in a data storage area when no shared marker column is stored in a temporary storage area or when a version number of a shared marker column that has been stored in the temporary storage area is different from a marker column version number in a table header;

using the marker column stored in the temporary storage area as another shared marker column; and setting a correspondence between a version number of the another shared marker column and the query request.

17. The method of claim 16, wherein the generating step further comprises:

determining, in the temporary storage area and according to the correspondence between the version number of the another or stored shared marker column and the query request, a shared marker column corresponding to the query request;

generating a query bitmap according to the conditional bitmap and the shared marker column corresponding to the query request when a value of a same row in both the shared marker column corresponding to the query request and the conditional bitmap is a valid value, when a value of a same row in the query bitmap is valid, or when a value of a same row in the shared marker column corresponding to the query request and that in the conditional bitmap are not both valid values, a value of a same row in the query bitmap is invalid; and obtaining, according to the query bitmap, a query result that meets both the query condition and a requirement that a marker bit of the query result in the shared marker column corresponding to the query request is valid.

18. A processing device, comprising:

a processor; and a non-transitory computer-readable storage medium coupled to the processor and storing programming instructions for execution by the processor, the programming instructions, when executed, prompt the processor to:

receive a query request sent by an application program, wherein the query request contains a query condition for a column-oriented database, the column-oriented database comprises a marker column and more than one data column, the data column is used to store specific data in a column store manner, and a value of a marker bit of each row in the marker column is used to indicate validity of data that is located in a same row as the marker bit in the more one data column;

scan, according to the query condition, a data column specified by the query condition and generating conditional bitmap, wherein, when a row in the involved data column meets the query condition, a corresponding row in the conditional bitmap is assigned a valid value, and when a row in the involved data column does not meet the query condition, a corresponding row in the conditional bitmap is assigned an invalid value;

generate a query bitmap according to the marker column and the conditional bitmap, when a value of a same row in both the marker column and the conditional bitmap is a valid value, a value of a same row in the query bitmap is valid, or when a value of a same row in the marker column and that in the conditional bitmap are not both valid values, a value of a same row in the query bitmap is invalid;

obtain, according to the query bitmap, a query result that meets both the query condition and a requirement that the marker bit of the query result in the marker column is valid; and receive the query result sent by the query module and send the query result to the application program.

19. A processing device, comprising:

a processor; and a non-transitory computer-readable storage medium coupled to the processor and storing programming instructions for execution by the processor, the programming instructions instruct the processor to:

receive, in a transaction, a modification request sent by an application program, wherein the modification request contains a modification condition, a column-oriented database includes a marker column and more than one data column, the data column is used to store specific data in a column store manner, and a value of a marker bit of each row in the marker column is used to indicate validity of data that is located in a same row as the marker bit in the more one data column;

changing the marker column and the more than one data column according to the modification condition;

record a modification that is to be made to the marker column when the transaction is submitted; and make a corresponding modification to the marker column according to the recorded modification that is to be made to the marker column when the transaction is submitted.

* * * * *